United States Patent
Kawamura

(10) Patent No.: US 8,631,886 B2
(45) Date of Patent: Jan. 21, 2014

(54) STRUCTURE OF ELECTRIC VEHICLE

(75) Inventor: Hiromichi Kawamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 414 days.

(21) Appl. No.: 13/011,755

(22) Filed: Jan. 21, 2011

(65) Prior Publication Data

US 2011/0180339 A1 Jul. 28, 2011

(30) Foreign Application Priority Data

Jan. 22, 2010 (JP) ................................. 2010-012385

(51) Int. Cl.
B60K 6/42 (2007.10)

(52) U.S. Cl.
USPC ....... 180/65.22; 903/905; 903/907; 180/65.1; 180/65.21

(58) Field of Classification Search
USPC ............ 180/54.1, 69.6, 65.6, 165, 300, 65.1, 180/65.21, 65.22, 65.245, 65.25, 65.275, 180/65.285; 903/905–907
See application file for complete search history.

(56) References Cited

U.S. PATENT DOCUMENTS

| | | | | |
|---|---|---|---|---|
| 6,026,921 A * | 2/2000 | Aoyama et al. | ............ | 180/65.25 |
| 7,047,929 B2 * | 5/2006 | Aketa et al. | ................ | 123/195 R |
| 2008/0060860 A1 | 3/2008 | Murase et al. | | |
| 2010/0041512 A1 * | 2/2010 | Silveri et al. | ........................ | 477/3 |
| 2010/0155158 A1 * | 6/2010 | Azuma et al. | ................ | 180/65.8 |
| 2011/0153134 A1 * | 6/2011 | Rocq et al. | ....................... | 701/22 |

FOREIGN PATENT DOCUMENTS

| | | |
|---|---|---|
| JP | 01262219 A | 10/1989 |
| JP | 07228158 A | 8/1995 |
| JP | 11099834 A | 4/1999 |
| JP | 11234808 A | 8/1999 |
| JP | 2002316541 A | 10/2002 |
| JP | 2002374603 A | 12/2002 |
| JP | 2006-051943 A | 2/2006 |
| JP | 2008063114 A | 3/2008 |

* cited by examiner

Primary Examiner — J. Allen Shriver, II
Assistant Examiner — James Triggs
(74) Attorney, Agent, or Firm — Alleman Hall McCoy Russell & Tuttle LLP

(57) ABSTRACT

This disclosure provides a structure of an electric vehicle, which includes an engine, an electric generator for being driven by the engine, a battery for being supplied and charged with generated power at least from the electric generator, and a motor for being supplied with power from the battery to drive driving wheels. The engine, the electric generator, and a power transmission device for transmitting a motive force of the engine to the electric generator are integrally formed to constitute a power generation unit. The power generation unit is arranged inside an engine room so that at least the engine is located rearward from wheel axles of left and right front wheels.

16 Claims, 16 Drawing Sheets

STRUCTURE OF ELECTRIC VEHICLE

BACKGROUND

The present invention relates to a structure of an electric vehicle including an engine, an electric generator for being driven by the engine, a battery for being supplied and charged with a generated power at least from the electric generator, and a motor that is supplied with the power from the battery to drive driving wheels.

Conventionally, an electric vehicle is known that has a structure including an engine, an electric generator for being driven by the engine, a battery for being supplied and charged with a generated power at least from the electric generator, and a motor that is supplied with the power from the battery to drive driving wheels.

JP 2006-51943A discloses in FIG. 10 thereof that, inside an engine room, an electric motor is arranged near an engine, a battery as a power supply source of the electric motor is arranged below rear seat(s), and a fuel tank is arranged below a floor under a driver's seat and a front passenger seat.

Further, one type of such an electric vehicle is a plug-in hybrid vehicle having the following features. When traveling a short distance, a battery is supplied and charged with external power, and the charged power is supplied to a motor to drive driving wheels; and, on the other hand, when traveling a long distance, an engine drives an electric generator, the generated power is supplied to the battery for charging, and the charged power is supplied to the motor to drive the driving wheels. In this plug-in hybrid vehicle, as described above, since the engine is driven basically only when the vehicle travels a long distance, the engine can be downsized.

Accordingly, in such electric vehicles, especially in plug-in hybrid vehicles equipped with a downsized engine as described above, it would be desirable when arranging the engine and the electric generator in an engine room to effectively use the space in the engine room and to reduce the yaw moment of inertia of these components.

SUMMARY

The present invention is made in view of the above situations to provide a structure of an electric vehicle including an engine, an electric generator for being driven by the engine, a battery for being supplied and charged with generated power at least from the electric generator, and a motor for being supplied with power from the battery to drive driving wheels to reduce a yaw moment of inertia and effectively use an engine room.

According to one aspect of the present invention, a structure of an electric vehicle includes an engine, an electric generator for being driven by the engine, a battery for being supplied and charged with generated power at least from the electric generator, and a motor for being supplied with power from the battery to drive driving wheels. The engine, the electric generator, and a power transmission device for transmitting a motive force of the engine to the electric generator are integrally formed to constitute a power generation unit. The power generation unit is arranged inside an engine room so that at least the engine is located rearward from wheel axles of left and right front wheels.

As described above, the engine, the electric generator, and the power transmission device are integrally formed to constitute the power generation unit and the power generation unit is arranged inside an engine room so that at least the engine is located rearward from the wheel axles of left and right front wheels. Therefore, the engine which is comparatively heavy is arranged in a comparatively rearward part of the vehicle, and thereby the yaw moment of inertia can be reduced.

Further, in the power generation unit, at least the engine is arranged rearward from the wheel axles of the front wheels. Therefore, a space in front of the engine and the engine room can effectively be used.

Thereby, the yaw moment of inertia can be reduced and the engine room can effectively be used.

In one embodiment of the invention, the power generation unit may entirely be arranged rearward from the wheel axles of the front wheels. The power transmission device may be one of a chain device and a gear device.

As described above, the power generation unit is entirely arranged rearward from the wheel axles of the front wheels. Therefore, the electric generator which is comparatively heavy is arranged comparatively rear part of the vehicle, thereby the yaw moment of inertia can further effectively be reduced.

Further, the power transmission device is one of the chain device or the gear device. Therefore, a motive force of the engine can be transmitted to the electric generator at a suitable rotational speed.

In one embodiment, the power transmission device may be a planetary gear device. The engine, the planetary gear device, and the electric generator are arranged along the vehicle width axis in this order so that a driving shaft of the engine and a rotation shaft of the electric generator extend along the vehicle width axis and are located coaxially.

In this embodiment, as described above, if the engine is downsized, the engine, the planetary gear device, and the electric generator can be arranged along the vehicle width axis, the power generation unit can be downsized, and the engine room can further effectively be used.

In one embodiment, the engine and the electric generator may be arranged vertically so that the engine is located below the electric generator.

As described above, the engine and the electric generator are arranged vertically. Therefore, a space can be created at the lateral position from the power generation unit, thereby the engine room can further effectively be used.

Further, because the engine and the electric generator are arranged vertically so that the engine is located below the electric generator, the engine which is comparatively heavy is arranged at a comparatively lower location in the vehicle, thereby the center of gravity can be lowered.

In one embodiment, the structure of the electric vehicle may further include an air-conditioning unit, a part of which is arranged above the engine, inside the engine room.

As described above, a part of the air-conditioning unit is arranged above the engine, inside the engine room. Therefore, the engine room can effectively be used and the instrument panel can be downsized.

In one embodiment, the engine and the electric generator may be arranged along the vehicle front-to-rear axis so that the engine is located rearward from the electric generator and a driving shaft of the engine and a rotation shaft of the electric generator extend along the vehicle width axis. The driving shaft of the engine and the rotation shaft of the electric generator may be coupled in parallel to each other via the power transmission device. The power generation unit may be arranged adjacent to one of left and right front side frames that are arranged inside the engine room so as to extend along the vehicle front-to-rear axis.

As described above, the engine and the electric generator are arranged along the vehicle front-to-rear axis so that the engine is located rearward from the electric generator and the driving shaft of the engine and the rotation shaft of the electric generator extend along the vehicle width axis. The driving shaft of the engine and the rotation shaft of the electric generator are coupled in parallel to each other via the power transmission device. Therefore, the length of the power generation unit along the vehicle width axis can be shortened.

Further, the power generation unit is arranged adjacent to one of the left and right front side frames that are arranged inside the engine room so as to extend along the vehicle front-to-rear axis. Therefore, as described above, together with the length of the power generation unit along the vehicle width axis being shortened, a space can be created inward of the power generation unit along the vehicle width axis and the engine room can further effectively be used (for example, using the space as a storage space).

In one embodiment, an intake system of the engine may be arranged above the power generation unit.

As described above, the intake system of the engine is arranged above the power generation unit. Therefore, the power generation unit which is needed for power generation and the intake system can be downsized, and, thereby the engine room can further effectively be used.

In one embodiment, the motor may be arranged in a rear part of the vehicle and drives left and right rear wheels that serve as the driving wheels.

As described above, the motor is arranged in the rear part of the vehicle. This means that the motor is arranged outside the engine room, and the corresponding space can be created inside the engine room, and the engine room can further effectively be used (for example, using the space as a storage space).

In one embodiment, the driving shaft of the engine may be coupled to the rotation shaft of the electric generator and the front wheels via a power splitting mechanism that serves as the power transmission device.

As described above, the driving shaft of the engine is coupled to the rotation shaft of the electric generator and the front wheels via the power splitting mechanism. Therefore, the front wheels can be driven by the engine, thereby the four-wheel drive becomes possible.

In one embodiment, the power transmission device may be a planetary gear device. The engine, the planetary gear device, and the electric generator may be arranged along the vehicle width axis in this order so that the driving shaft of the engine and the rotation shaft of the electric generator extend along the vehicle width axis and are located coaxially.

In this embodiment, as described above, if the engine is downsized, the engine, the planetary gear, and the electric generator can be arranged along the vehicle width axis, the power generation unit can be downsized, and the engine room can further effectively be used.

In one embodiment, the engine may be a single-rotor rotary engine.

As described above, the engine is the single-rotor rotary engine. Therefore, the longitudinal length of the engine (the length along the driving shaft) can be shortened.

In one embodiment, the power transmission device may be a planetary gear device. The engine, the planetary gear device, and the electric generator may be arranged along the vehicle width axis in this order so that a driving shaft of the engine and a rotation shaft of the electric generator extend along the vehicle width axis and are located coaxially.

In this embodiment, as described above, if the engine is downsized, the engine, the planetary gear, and the electric generator can be arranged along the vehicle width axis, the power generation unit can be downsized, and the engine room can further effectively be used.

In one embodiment, the engine and the electric generator may be arranged vertically so that the engine is located below the electric generator.

As described above, the engine and the electric generator are arranged vertically. Therefore, a space can be created at the lateral position from the power generation unit, thereby the engine room can further effectively be used.

Further, because the engine and the electric generator are arranged vertically so that the engine is located below the electric generator, the engine which is comparatively heavy is arranged at a comparatively lower location in the vehicle, thereby the center of gravity can be lowered.

In one embodiment, the structure of the electric vehicle may further include an air-conditioning unit, a part of which is arranged above the engine, inside the engine room.

As described above, a part of the air-conditioning unit is arranged above the engine, inside the engine room. Therefore, the engine room can effectively be used and the instrument panel can be downsized.

In one embodiment, the engine and the electric generator may be arranged along the vehicle front-to-rear axis so that the engine is located rearward from the electric generator and a driving shaft of the engine and a rotation shaft of the electric generator extend along the vehicle width axis. The driving shaft of the engine and the rotation shaft of the electric generator may be coupled in parallel to each other via the power transmission device. The power generation unit may be arranged adjacent to one of left and right front side frames that are arranged inside the engine room so as to extend along the vehicle front-to-rear axis.

As described above, the engine and the electric generator are arranged along the vehicle front-to-rear axis so that the engine is located rearward from the electric generator and the driving shaft of the engine and the rotation shaft of the electric generator extend along the vehicle width axis. The driving shaft of the engine and the rotation shaft of the electric generator are coupled in parallel to each other via the power transmission device. Therefore, the length of the power generation unit along the vehicle width axis can be shortened.

Further, the power generation unit is arranged adjacent to one of the left and right front side frames that are arranged inside the engine room so as to extend along the vehicle front-to-rear axis. Therefore, as described above, together with the length of the power generation unit along the vehicle width axis being shortened, a space can be created inward of the power generation unit along the vehicle width axis and the engine room can further effectively be used (for example, using the space as a storage space).

In one embodiment, an intake system of the engine may be arranged above the power generation unit.

As described above, the intake system of the engine is arranged above the power generation unit. Therefore, the power generation unit which is needed for power generation and the intake system can be downsized, and, thereby the engine room can further effectively be used.

In one embodiment, the motor may be arranged in a rear part of the vehicle and drives left and right rear wheels that serve as the driving wheels.

As described above, the motor is arranged in the rear part of the vehicle. This means that the motor is arranged outside the engine room, and the corresponding space can be created inside the engine room, and the engine room can further effectively be used (for example, using the space as a storage space).

In one embodiment, the driving shaft of the engine may be coupled to the rotation shaft of the electric generator and the front wheels via a power splitting mechanism that serves as the power transmission device.

As described above, the driving shaft of the engine is coupled to the rotation shaft of the electric generator and the front wheels via the power splitting mechanism. Therefore, the front wheels can be driven by the engine, thereby the four-wheel drive becomes possible.

According to another aspect of the present invention, a structure of an electric vehicle includes an engine, an electric generator for being driven by the engine, a battery for being supplied and charged with generated power at least from the electric generator, and a motor for being supplied with power from the battery to drive driving wheels. The engine, the electric generator, and a power transmission device for transmitting a motive force of the engine to the electric generator are integrally formed to constitute a power generation unit, and the power generation unit is arranged inside an engine room so that at least the engine is located rearward from wheel axles of left and right front wheels. The motor is arranged in a rear part of the vehicle and drives left and right rear wheels that serve as the driving wheels. The driving shaft of the engine is coupled to the rotation shaft of the electric generator and the front wheels via a power splitting mechanism as the power transmission device. The engine may be a single-rotor rotary engine or a reciprocating engine having one cylinder or two cylinders. The power transmission device is a planetary gear device, the engine, the planetary gear device, and the electric generator are arranged along the vehicle width axis in this order so that the driving shaft of the engine and the rotation shaft of the electric generator extend along the vehicle width axis and are located coaxially, and the engine, the planetary gear device, and the electric generator are arranged rearward from the wheel axles of the front wheels.

As described above, the engine, the electric generator, and the power transmission device are integrally formed to constitute the power generation unit, and the power generation unit is arranged inside the engine room so that at least the engine is located rearward from the wheel axles of left and right front wheels. Therefore, the engine which is comparatively heavy is arranged in comparatively rear part of the vehicle, thereby the yaw moment of inertia can be reduced.

Further, the motor is arranged in the rear part of the vehicle. This means that the motor is arranged outside the engine room, and the corresponding space can be created inside the engine room, and the engine room can further effectively be used (for example, using the space as a storage space).

Further, the driving shaft of the engine is coupled to the rotation shaft of the electric generator and the front wheels via a power splitting mechanism. Therefore, the front wheels can be driven by the engine, thereby the four-wheel drive becomes possible.

Further, the engine is the single-rotor rotary engine or the reciprocating engine having one cylinder or two cylinders. Therefore, the longitudinal length of the engine (the length along the driving shaft axis) can be shortened.

Moreover, the engine is downsized. Therefore, the engine, the electric generator, and the planetary gear device can be arranged along the vehicle width axis near the rear side of the wheel axles of the front wheels, the power generation unit can be downsized, the yaw moment of inertia can further be reduced, and the engine room can further effectively be used.

DETAILED DESCRIPTION OF THE EMBODIMENTS

Hereinafter, embodiments of the present invention are described in detail with reference to the appended drawings.
Embodiment 1
—Configuration of Driving System of Electric Vehicle—

Figure 1:
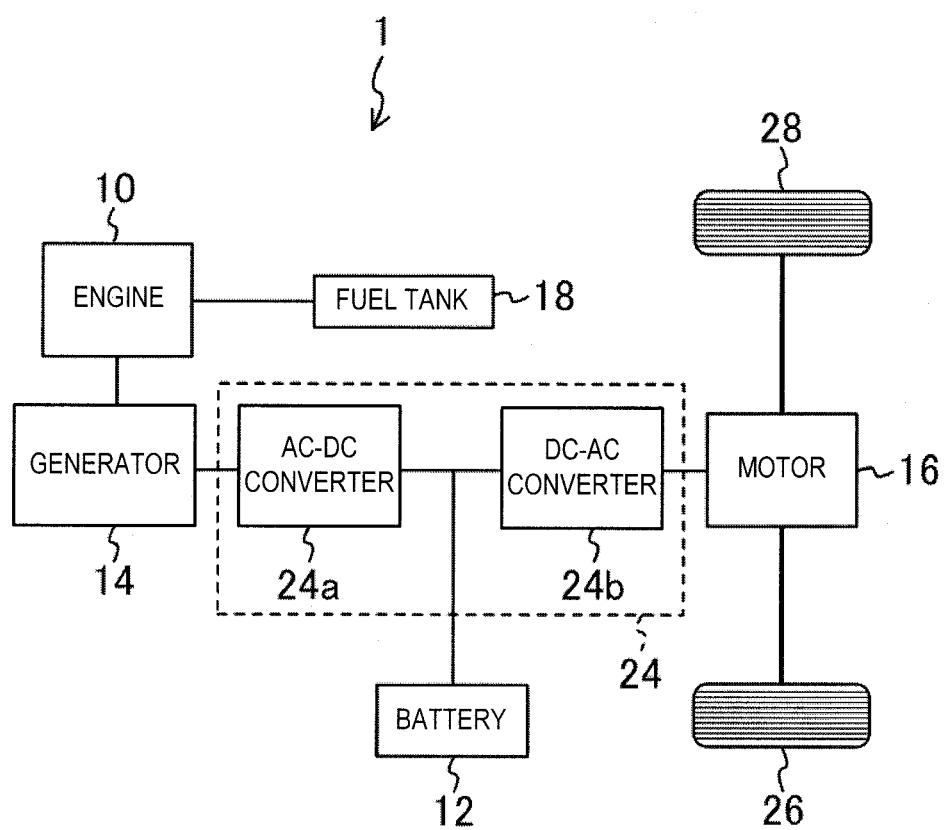
FIG. 1 is a block diagram schematically showing a drive system of an electric vehicle according to a first embodiment of the invention.

FIG. 1 is a block diagram schematically showing a driving system of an electric vehicle equipped with an engine according to a first embodiment of the present invention. This electric vehicle 1 is a plug-in hybrid vehicle in which, when traveling a short distance (e.g., when traveling 50 km or shorter), power in a battery 12, charged by being supplied with external power from an external power source such as a home power source, is supplied to a motor 16 to drive driving wheels, and, on the other hand, when traveling a long distance, a generator 14 (electric generator) is driven by an engine 10, the generated power is supplied to the battery 12 for charging, and the charged power in the battery 12 is supplied to the motor 16 to drive the driving wheels. This plug-in hybrid vehicle is a series hybrid vehicle which includes the engine 10 and the motor 16 as its power sources as described above, and the engine 10 is only used for the power generation while all the motive force for the vehicle 1 to travel is relied on the motor 16.

In this embodiment, the engine 10 is a rotary engine. A rotor of a substantially triangular shape is accommodated in a rotor accommodating chamber (cylinder) surrounded by a cocoon-shaped rotor housing 10*a* having a trochoid inner circumferential surface (illustrated in FIG. 4 and other figures) and side housings 10*b* (illustrated in FIG. 4 and other figures), and three operating cavities are partitioned radially outward from the rotor. Further, the rotary engine 10 is a compact and single-rotor engine which is constructed by integrating the single rotor housing 10*a* and the two side housings 10*b* so that the single rotor housing 10*a* is interposed between the two side housings 10*b*, and accommodating the rotor in the single cylinder formed therebetween.

The rotor is supported to carry out a planetary rotational movement with respect to an eccentric shaft 10*c* or a driving shaft (see FIG. 4) which penetrates the side housings 10*b*. The rotor revolves centering on the axis of the eccentric shaft 10*c* while rotating around an eccentric wheel of the eccentric shaft 10*c*, in a state where seal parts arranged to respective three apexes on the outer circumference of the rotor are in contact with the trochoid inner circumferential surface of the rotor housing 10*a*. While the rotor revolves by 360°, the operating cavities formed between respective apexes of the rotor move in a circumferential direction to perform each of the strokes of intake, compression, expansion (combustion), and exhaust, and the rotation force generated thereby is outputted from the eccentric shaft 10*c* via the rotor.

Two ignition plugs are attached near the short axis of the rotor housing 10*a*, and two electronic-controlled fuel injection valves (injectors) for directly injecting fuel into the cylinder are attached near the long axis. The injectors are connected to a fuel tank 18 for the engine 10. Accordingly, the fuel (for example, gasoline, gasohol, ethanol, natural gas, biomethane gas, and hydrogen gas) supplied from the fuel tank 18 is injected into the cylinder by the injectors.

In the rotor housing 10*a*, an intake port communicating with the operating cavity which is located in intake stroke is formed and an exhaust port communicating with the operating cavity which is located in exhaust stroke is formed. Further, an intake passage 20 or an intake pipe (corresponding to an "intake system of the engine" illustrated in FIG. 2 and other figures) communicates with the intake port, and an exhaust passage 22 or an exhaust pipe (corresponding to an "exhaust system of the engine" illustrated in FIG. 2 and other figures) communicates with the exhaust port. In the intake passage 20, an air cleaner 20*a* using a filter for removing foreign matters and dusts in intake air is provided. In the exhaust passage 22, an exhaust emission control device 22*a* of a substantially long cylinder shape using a three-way catalyst for purifying hazardous components in exhaust gas, such as HC, CO and NOx, is provided, and a muffler 22*b* of a substantially long cylinder shape for cancelling out a pressure variation of the energy generated by the explosion sound of the exhaust gas and absorbing the energy to reduce the sound is provided downstream of the exhaust emission control device 22*a*.

When a remaining battery level of the battery 12 is low (for example, when a state of charge SOC of the battery 12 becomes 30% or lower), the engine 10 is automatically operated. Note that, as described above, because the engine 10 is downsized, the fuel tank 18 and the air cleaner 20*a* are also downsized.

The battery 12 is a large-sized and large-capacity battery with high performance. The battery 12 is connected to the generator 14 and the motor 16 via an inverter 24, and is supplied and charged with the generated power from the generator 14 and regenerated power from the motor 16. Then, the battery 12 supplies the power to drive the motor 16. Further, when the vehicle 1 is not used, the battery 12 can be supplied and charged with the external power from the external power source.

The generator 14 is coupled to the eccentric shaft 10*c* of the engine 10 by its rotation shaft 14*a* (input shaft) (illustrated in FIG. 4) and can be driven by the engine 10.

The motor 16 is constituted with a left front wheel motor 16*a* and a right front wheel motor 16*b*. The left front wheel motor 16*a* is coupled by its rotation shaft to a left front wheel 26 via a reduction gear 30 and a driving shaft 32, and, by being supplied with the power from the battery 12 and/or the generator 14, it drives the left front wheel 26. The right front wheel motor 16*b* is coupled by its rotation shaft to a right front wheel 28 via the reduction gear 30 and a driving shaft 32, and, by being supplied with the power from the battery 12 and/or the generator 14, it drives the right front wheel 28. The reduction gear 30 ultimately reduces the rotational speeds of the motors 16*a* and 16*b* and transmits the motive forces of the motors 16*a* and 16*b* to the front wheels 26 and 28, respectively.

The inverter 24 includes an AC-DC converter 24*a* (an inverter for the generator 14) for converting an AC power into a DC power and a DC-AC converter 24*b* (an inverter for the motor 16) for converting a DC power into an AC power, and performs mutual transfers and conversions of power among the battery 12, the generator 14, and the motor 16. Specifically, when charging the battery 12 with the power from the generator 14, the AC power from the generator 14 is converted into the DC power by the AC-DC converter 24*a* to be supplied to the battery 12. Alternatively, when supplying the power from the battery 12 to the motor 16, the DC power from the battery 12 is converted into the AC power by the DC-AC converter 24*b* to be supplied to the motor 16. Moreover, when supplying the power from the generator 14 to the motor 16, the AC power from the generator 14 is converted into the DC power by the AC-DC converter 24*a*, and the DC power is then converted into the AC power by the DC-AC converter 24*b* to be supplied to the motor 16.

—Entire Structure of Electric Vehicle—

Figure 2:
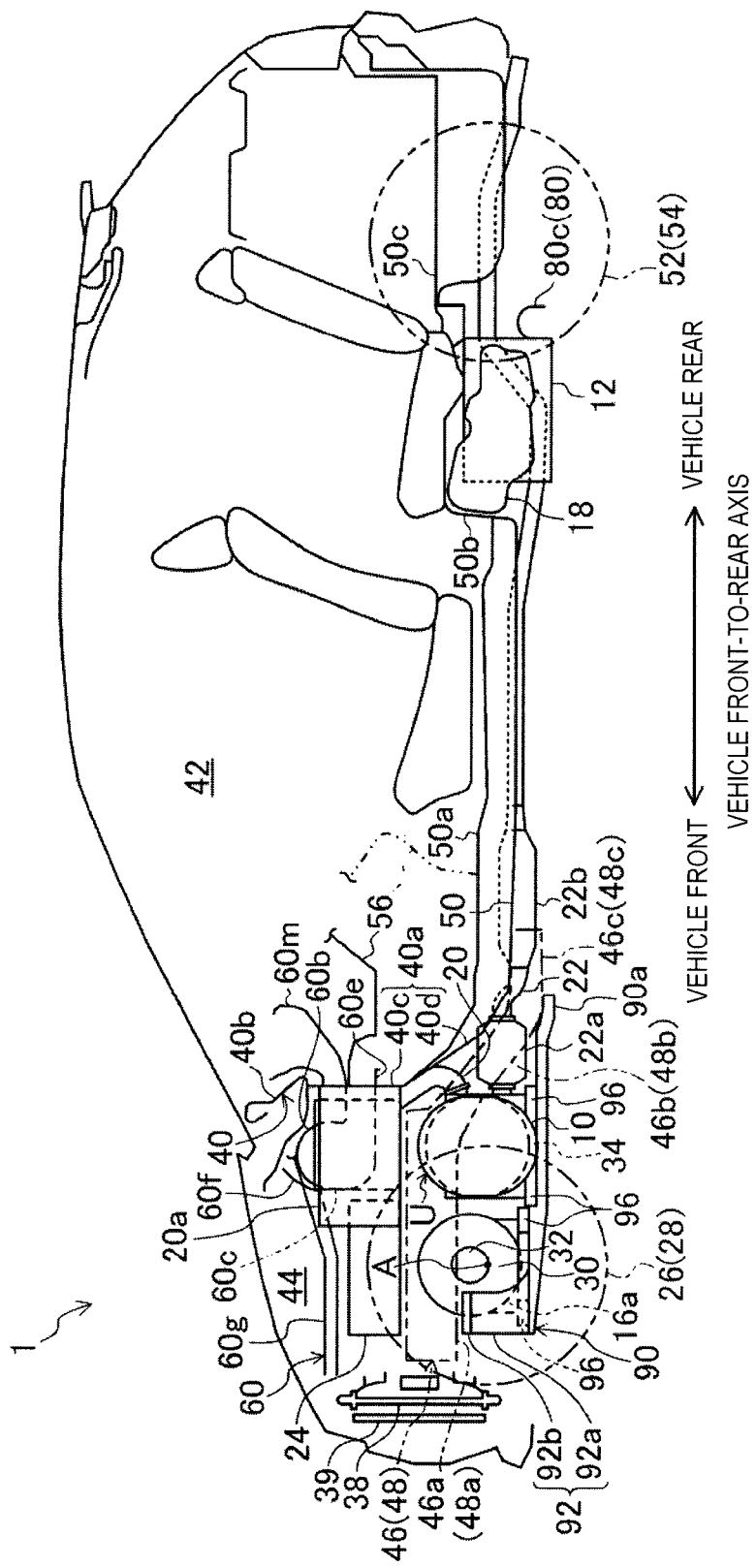
FIG. 2 is a side view schematically showing the entire structure of the electric vehicle according to the first embodiment of the invention.
Figure 3:
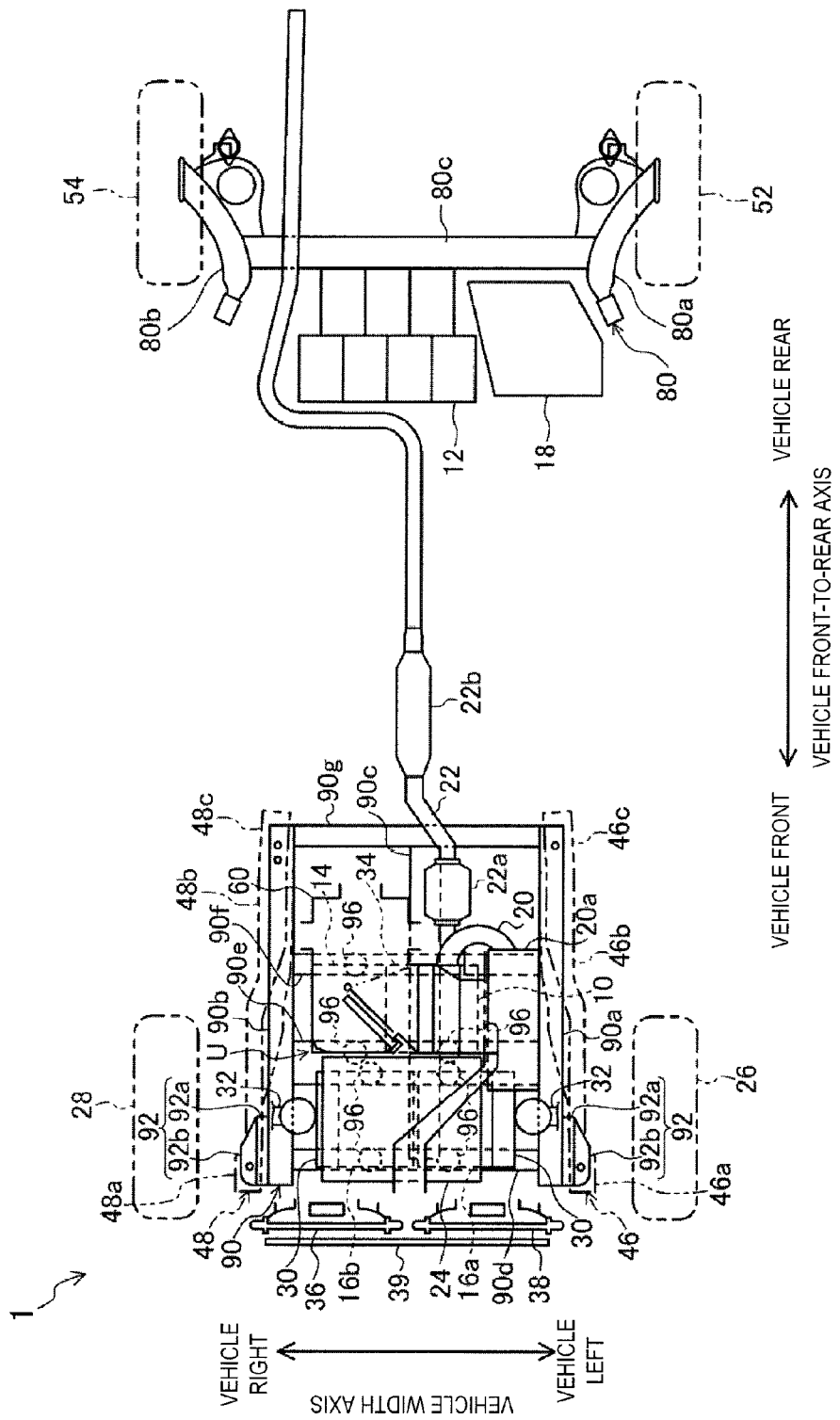
FIG. 3 is a plan view schematically showing the entire structure of the electric vehicle according to the first embodiment of the invention.
Figure 4:
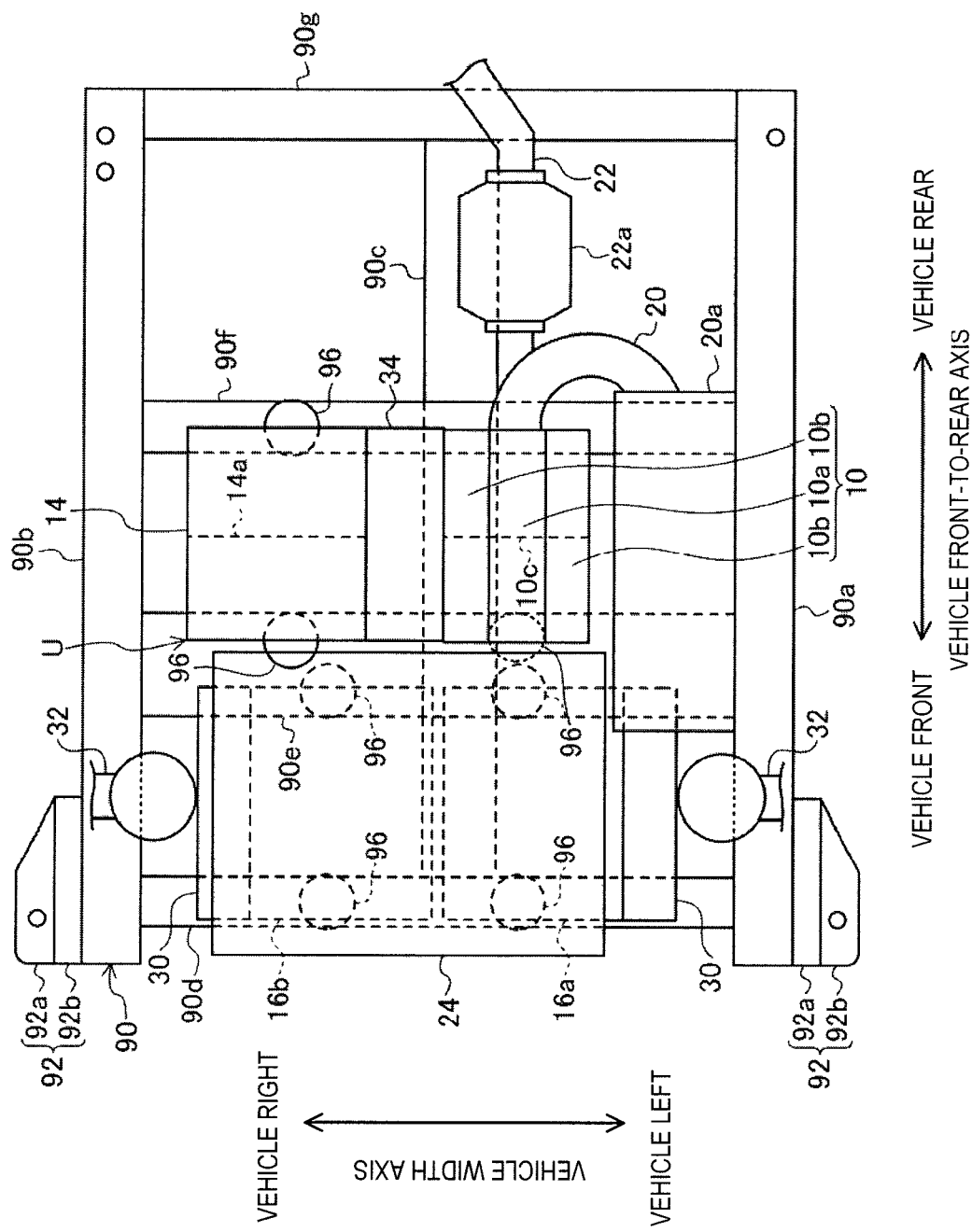
FIG. 4 is a plan view schematically showing how a power generation unit, a motor and the like are attached to a perimeter frame, according to the first embodiment of the invention.
Figure 5:
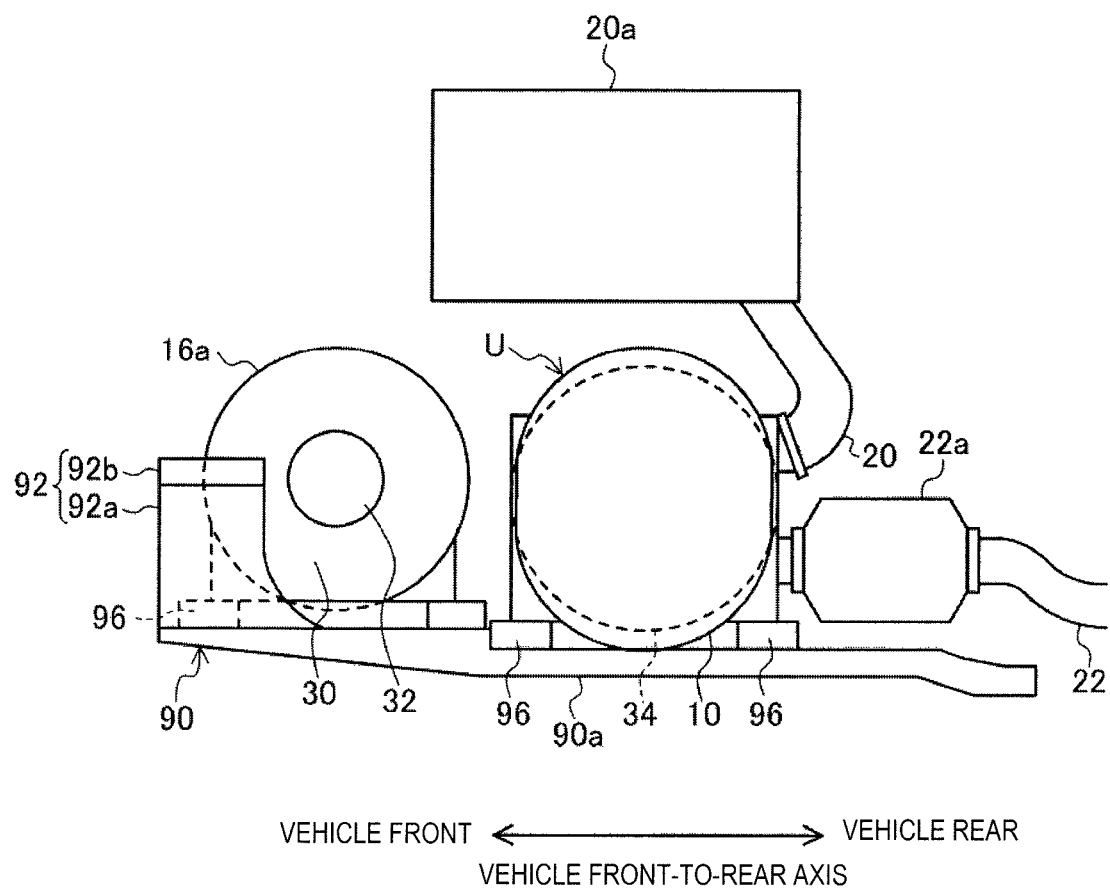
FIG. 5 is a side view schematically showing how the power generation unit, the motor and the like are attached to the perimeter frame, according to the first embodiment of the invention.
Figure 6:
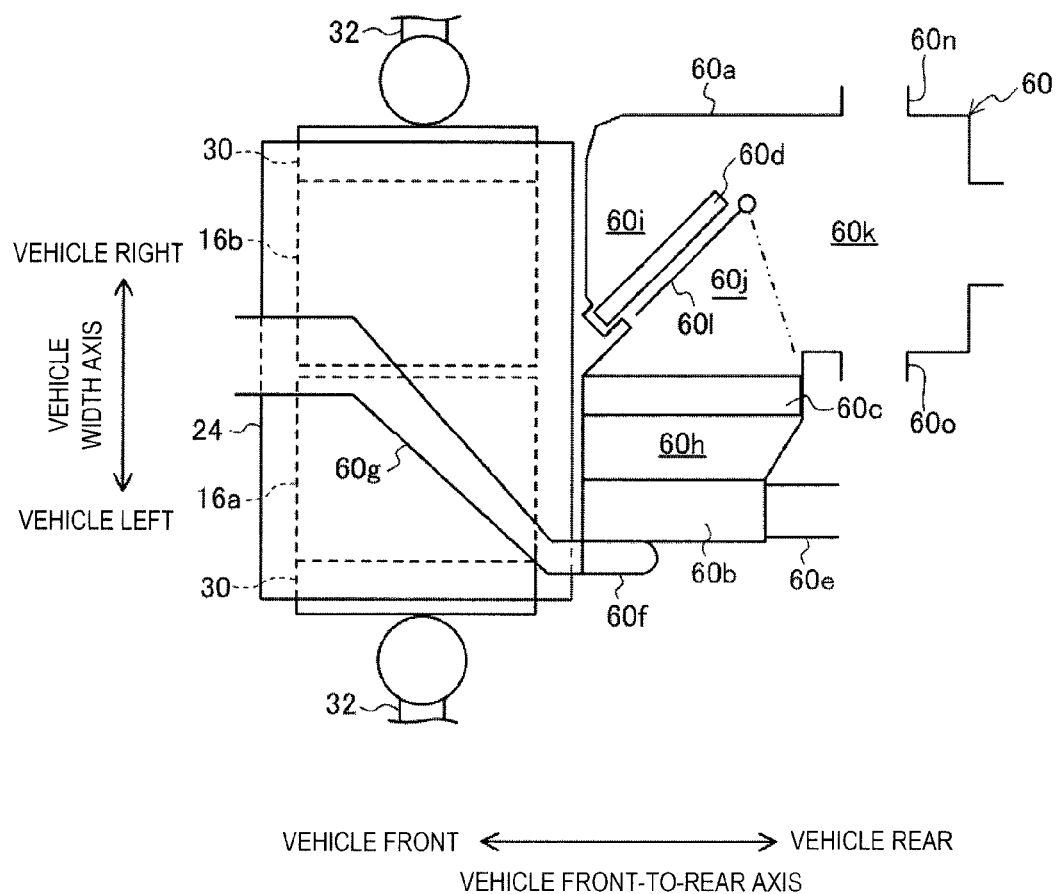
FIG. 6 is a plan view schematically showing an arrangement of an air-conditioning unit, the motor and the like, according to the first embodiment of the invention.

Hereinafter, the entire structure of the electric vehicle 1 is described. FIG. 2 is a side view schematically showing the entire structure of the electric vehicle. FIG. 3 is a plan view schematically showing the entire structure of the electric vehicle. FIG. 4 is a plan view schematically showing how a power generation unit, a motor and the like are attached to a perimeter frame. FIG. 5 is a side view schematically showing how the power generation unit, the motor and the like are attached to the perimeter frame. FIG. 6 is a plan view schematically showing an arrangement of an air-conditioning unit, the motor and the like. Note that, in these figures, for easier view of the drawings, illustrations of the components are suitably omitted or simplified.

First, the structure of a front part of the electric vehicle 1 is described.

A vehicle front space in front of a dashboard panel 40, which is partitioned from a vehicle cabin 42 by the dashboard panel 40, is formed in the front part of the vehicle 1 as an engine room 44. The dashboard panel 40 includes a lower dashboard part 40a standing upward from a front end of a floor panel 50 for forming a bottom surface of the cabin 42, and extending along the vehicle width axis, and an upper dashboard part 40b extending upward from an upper end of the lower dashboard part 40a. The lower dashboard part 40a includes a vertical wall part 40c extending along the vertical axis and an inclined wall part 40d extending obliquely downward and rearward from a lower end of the vertical wall part 40c and coupled to the floor panel 50. Left and right front side frames 46 and 48 are arranged on both sides of the engine room 44 along the vehicle width axis and extend along the vehicle front-to-rear axis, respectively. These front side frames 46 and 48 include first horizontal parts 46a and 48a extending at the front side of the dashboard panel 40 along the vehicle front-to-rear axis, inclined parts 46b and 48b extending obliquely downward and rearward from rear ends of the first horizontal parts 46a and 48a along a front surface of the inclined wall part 40d of the lower dashboard part 40a, and second horizontal parts 46c and 48c extending rearward from rear ends of the inclined parts 46b and 48b along a lower surface of the floor panel 50. In the center part of the floor panel 50 along the vehicle width axis, a floor tunnel 50a is formed so as to extend along the vehicle front-to-rear axis and bulge upward.

In the engine 10, the eccentric shaft 10c extends along the vehicle width axis, the intake and exhaust ports face rearward, and the intake port is arranged above the exhaust port.

The generator 14 is arranged so that the rotation shaft 14a extends rightward from the engine 10 along the vehicle width axis. The rotation shaft 14a of the generator 14 is coupled in series to the eccentric shaft 10c of the engine 10 via a planetary gear device 34. That is, the engine 10, the generator 14, and the planetary gear device 34 are arranged in line from the left to the right along the vehicle width axis in order of the engine 10, the planetary gear device 34, and the generator 14 so that the eccentric shaft 10c of the engine 10 and the rotation shaft 14a of the generator 14 are located coaxially. The planetary gear device 34 includes a sun gear, a ring gear, and a planetary carrier. The sun gear is connected with the eccentric shaft 10c of the engine 10 and the ring gear is connected with the rotation shaft 14a of the generator 14, to reduce the rotational speed of the engine 10 and transmit the motive force of the engine 10 to the generator 14. That is, the planetary gear device 34 constitutes a power transmission device for transmitting the motive force of the engine 10 to the generator 14.

Further, the engine 10, the generator 14, and the planetary gear device 34 are integrally coupled to each other to constitute a power generation unit U. The power generation unit U is entirely arranged rearward from wheel axles A located at the centers of front wheels 26 and 28, inside the engine room 44. Specifically, the power generation unit U is arranged so that the engine 10 is located in a left part of the engine room 44, and the generator 14 and the planetary gear device 34 are located in a right part of the engine room 44. The upper end of the power generation unit U is lower than respective upper surfaces of the first horizontal parts 46a and 48a of the front side frames 46 and 48 and higher than respective lower surfaces of the same, while the lower end of the power generation unit U is lower than the lower surfaces of the first horizontal parts 46a and 48a.

The left front wheel motor 16a and the right front wheel motor 16b are integrally coupled to the reduction gear 30, arranged forward from the power generation unit U, inside the engine room 44, and allocated side by side along the vehicle width axis. Specifically, the left front wheel motor 16a is provided in the left part of the engine room 44, while the right front wheel motor 16b is provided in the right part of the engine room 44. The upper ends of the left front wheel motor 16a and the right front wheel motor 16b are located at substantially the same height as the upper end of the engine 10, and the lower ends thereof are located at substantially the same height as the lower end of the engine 10.

The intake passage 20 extends upward from the rear upper part of the engine 10 while curving forward, and further extends forward. The air cleaner 20a is arranged obliquely leftward from and above the engine 10 in the left part of the engine room 44.

The exhaust passage 22 passes below the center part of the floor panel 50 along the vehicle width axis from the rear lower part of the engine 10 and further extends rearward. Further, in a rear part of the vehicle 1, the exhaust passage 22 reaches a position near in front of the battery 12, further extends leftward to reach the right end side part of the vehicle 1, and passes through the right side of the battery 12 and further extend rearward. The exhaust emission control device 22a is arranged below the inclined wall part 40d of the lower dashboard part 40a. The muffler 22b is arranged below the center part of the floor panel 50 along the vehicle width axis (specifically, inside the floor tunnel 50a). The inverter 24 is arranged above the left front wheel motor 16a and the right front wheel motor 16b, inside the engine room 44.

The power generation unit U, the left front wheel motor 16a, and the right front wheel motor 16b are attached to a perimeter frame 90. Hereinafter, this attaching structure is described in detail.

The perimeter frame 90 suppresses the transmission of vibrations of the engine 10, and disperses and absorbs an impact load applied at the time of a frontal collision of the vehicle 1. The perimeter frame 90 includes left and right side frames 90a and 90b extending along the vehicle front-to-rear axis, a first inner frame 90c arranged in the middle of the side frames 90a and 90b and extending in parallel to the side frames 90a and 90b, a front frame 90d extending along the vehicle width axis and coupled to respective front end parts of the side frames 90a and 90b and the first inner frame 90c, a second inner frame 90e arranged rearward from the front frame 90d, extending in parallel to the front frame 90d, and coupled to the side frames 90a and 90b and the first inner frame 90c, a third inner frame 90f arranged rearward from the second inner frame 90e, extending in parallel to the second inner frame 90e, and coupled to the side frame 90a and 90b and the first inner frame 90c, and a rear frame 90g arranged rearward from the third inner frame 90f, extending in parallel to the third inner frame 90f, and coupled to respective rear end parts of the side frames 90a and 90b and the first inner frame 90c. Brackets 92 are attached on the respective outer surfaces along the vehicle width axis of the front end parts of the side frames 90a and 90b. Each of the brackets 92 includes a vertical part 92a extending upward from the side frames 90a and 90b, respectively, and a horizontal part 92b extending outward along the vehicle width axis from an upper end of the vertical part 92a.

The power generation unit U is elastically supported by an upper surface of a left part of the second inner frame 90e via a vibration absorbing mount 96 provided forward from a lower part of the engine 10, by an upper surface of a right part of the second inner frame 90e via a vibration absorbing mount 96 provided to a front lower part of the engine 10, and by an upper surface of a right part of the third inner frame 90f via a vibration absorbing mount 96 provided to a rear lower part of the engine 10. The left front wheel motor 16a is elastically supported by an upper surface of a left part of the front frame 90d via a vibration absorbing mount 96 provided to a front lower part of the left front wheel motor 16a, and by an upper surface of a left part of the second inner frame 90d via a vibration absorbing mount 96 provided to a rear lower part of the left front wheel motor 16a. The right front wheel motor 16b is elastically supported by an upper surface of a right part of the front frame 90d via a vibration absorbing mount 96 provided to a front lower part of the right front wheel motor 16a, and by an upper surface of a right part of the front frame 90d via a vibration absorbing mount 96 provided to a rear lower part of the right front wheel motor 16a.

Further, the perimeter frame 90 to which the power generation unit U and the left and right front wheel motors 16a and 16b are attached is attached to the front side frames 46 and 48. That is, after attaching the power generation unit U and the left and right front wheel motors 16a and 16b to the perimeter frame 90, the perimeter frame 90 is attached to the front side frames 46 and 48. Specifically, in the perimeter frame 90, the horizontal parts 92b of the brackets 92 are attached to respective lower surfaces of the first horizontal parts 46a and 48a of the front side frames 46 and 48, and rear end parts of the side frames 90a and 90b of the perimeter frame 90 are attached to respective lower surfaces of the second horizontal parts 46b and 48b of the front side frames 46 and 48. Thus, by attaching to the front side frames 46 and 48 the perimeter frame 90 to which the power generation unit U and the left and right front wheel motors 16a and 16b are attached, the power generation unit U and the left and right front wheel motors 16a and 16b are arranged inside the engine room 44, as described above.

The reference numeral 36 indicates a radiator for the motor 16, the reference numeral 38 indicates a radiator for the engine 10, and the reference numeral 39 indicates a cooler condenser.

As described above, the power generation unit U and the motor 16 are attached to and supported by the vehicle body.

Further, an air-conditioning unit 60 is arranged above the power generation unit U, inside the engine room 44. In the air-conditioning unit 60, a blower 60b, an evaporator 60c for cooling air, and a heater 60d for heating the air are arranged in a case 60a in this order from the upstream to the downstream.

The blower 60b is arranged in a left end part of the case 60a. An internal air introducing passage 60e for taking air inside the cabin into the case 60a, and first and second external air introducing passages 60f and 60g for taking air outside the cabin into the case 60a are formed upstream of the blower 60b. The internal air introducing passage 60e extends rearward from a lower part of the blower 60b, penetrates the vertical wall part 40c of the lower dashboard part 40a to reach inside the cabin 42 and opens downward. The first external air introducing passage 60f extends upward from an upper part of the blower 60b and takes into the case 60a the external air which is taken into the cowl box. The second external air introducing passage 60g extends obliquely rightward and forward from an upper part of the blower 60b, passes above the inverter 24, and reaches a center part of the engine room 44 in the vehicle width axis to take in air stream at the time of traveling. Only one of the internal air introducing passage 60e and the external air introducing passage (passages 60f and 60g) opens at a time and, therefore, the other closes at the same moment. Thereby, by closing the external air introducing passages 60f and 60g, only the air inside the cabin is introduced into the case 60a, and, alternatively, by closing the internal air introducing passage 60e, only the air outside the cabin is introduced into the case 60a.

A cold air passage 60h is formed downstream of the blower 60b, and the evaporator 60c is accommodated in the cold air passage 60h. A heating passage 60i and a non-heating passage 60j are formed downstream of the cold air passage 60h in parallel. An air mixing passage 60k where the passages 60i and 60j are joined is formed downstream of the heating passage 60i and the non-heating passage 60j.

The heater 60d is arranged in the heating passage 60i. Thereby, air flowing in the heating passage 60i is heated by the heater 60d. On the other hand, air passed through the evaporator 60c further passes through the non-heating passage 60j as is. Further, the air passed through the heating passage 60i and the non-heating passage 60j are mixed in the air mixing passage 60k to be air-conditioned air.

An air mixing door 60l for adjusting respective degrees of opening the heating passage 60i and the non-heating passage 60j is provided to the heater 60d on the side of the non-heating passage 60j. Based on the degree of opening the air mixing door 60l, a temperature of the air-conditioned air obtained in the air mixing passage 60k can be adjusted.

A defroster passage 60m, a driver's seat side passage 60n, and a passenger seat side passage 60o, which communicate with the air mixing passage 60k, are formed downstream of the air mixing passage 60k. The defroster passage 60m penetrates the vertical wall part 40c of the lower dashboard part 40a and reaches inside the cabin 42. The defroster passage 60m communicates with a defroster outlet formed so that it opens upward to blow out the air-conditioned air toward an inner surface of a windshield glass, in a front end part of an upper surface of an instrument panel 56 inside the cabin 42. The defroster outlet extends along the vehicle width axis. The driver's seat side passage 60n communicates with a driver's seat side outlet which is formed in the instrument panel 56 so that the air-conditioned air blows out toward a driver's seat inside the cabin. The passenger seat side passage 60o communicates with a passenger seat side outlet which is formed in the instrument panel 56 so that the air-conditioned air blows out toward a passenger seat inside the cabin.

The defroster passage 60m is provided with a defroster door, and when the defroster door is opened, the air-conditioned air inside the air mixing passage 60k blows out of the defroster outlet via the defroster passage 60m. The driver's seat side passage 60n is provided with a driver's seat side door, and, by opening the driver's seat side door, the air-conditioned air inside the air mixing passage 60k blows out of the driver's seat side outlet via the driver's seat side passage 60n. The passenger seat side passage 60o is provided with a passenger seat side door, and, by opening the passenger seat side door, the air-conditioned air inside the air mixing passage 60k blows out of the passenger seat side outlet via the passenger seat side passage 60o.

As described above, a part of the conditioning module 60 is arranged above the power generation unit U, inside the engine room 44.

Next, a rear part structure of the electric vehicle 1 is briefly described.

In a rear portion of the center part of the floor panel 50 along the vehicle front-to-rear axis, a kick-up part 50b is formed so that it stands upward, and a rear floor panel 50c is formed from an upper end of the kick-up part 50b so that it extends rearward. As for the rear wheels 52 and 54, a torsion-beam suspension 80 in which left and right trailing arms 80a and 80b are connected with each other by a beam called a "cross beam" 80c is adopted in this embodiment. The cross beam 80c is arranged below the center part of the rear floor panel 50c along the vehicle front-to-rear axis and extends along the vehicle width axis so that it is located forward from wheel axles at the centers of the rear wheels 52 and 54 and rearward from the front ends of the rear wheels 52 and 54, in the vehicle side view. The battery 12 is arranged below a section between a center part and a right part of the rear floor panel 50c along the vehicle width axis and forward from the cross beam 80c. The fuel tank 18 is arranged below a left part of the rear floor panel 50c and forward from the cross beam 80c.

—Effects—

As described above, in this embodiment, the engine 10, the generator 14, and the planetary gear device 34 are integrally formed to constitute the power generation unit U, and the entire power generation unit U is arranged rearward from the wheel axles A of the left and right front wheels 26 and 28, inside the engine room 44. Therefore, the engine 10, the generator 14, and the planetary gear device 34 which are comparatively heavy are arranged in a comparatively rear part of the vehicle, thereby a yaw moment of inertia can be reduced.

Further, the entire power generation unit U is arranged rearward from the wheel axles A of the front wheels 26 and 28. Therefore, the space in front of the power generation unit U (including the vehicle front space) can effectively be used, and the engine room 44 can effectively be used.

Thereby, the yaw moment of inertia can be reduced, and the engine room 44 can effectively be used.

Further, the entire power generation unit U is arranged rearward from the wheel axles A of the front wheels 26 and 28. Therefore, if driving shafts for coupling the left and right front wheels 26 and 28 exist, the exhaust passage 22 of the rear-exhaust engine 10 is not needed to pass above the driving shafts, thereby the hood can be lowered.

Further, the power transmission device is constituted with the planetary gear device 34. Therefore, the motive force of the engine 10 can be transmitted to the generator 14 at a suitable rotational speed.

Moreover, the engine 10 is downsized. Therefore, according to this embodiment, the engine 10, the generator 14, and the planetary gear device 34 can be arranged in line along the vehicle width axis, thereby the power generation unit U can be downsized and the engine room 44 can further effectively be used.

The part of the air-conditioning unit 60 is arranged above the engine 10, inside the engine room 44. Therefore, the engine room 44 can effectively be used, the instrument panel 56 can be downsized (in FIG. 2, the solid line indicates the instrument panel 56 of this embodiment and the two-dot chain line indicates the conventional instrument panel 56).

Further, the engine 10 is constituted with the single-rotor rotary engine. Therefore, the longitudinal length of the engine 10 along the vehicle front-to-rear axis (the length along the eccentric shaft 10c) can be shortened.

Embodiment 2

This embodiment is different from the first embodiment in that, for example, a power generation unit U is arranged adjacent to one of the left and right front side frames 46 and 48. Hereinafter, the difference is described in detail.

Figure 7:
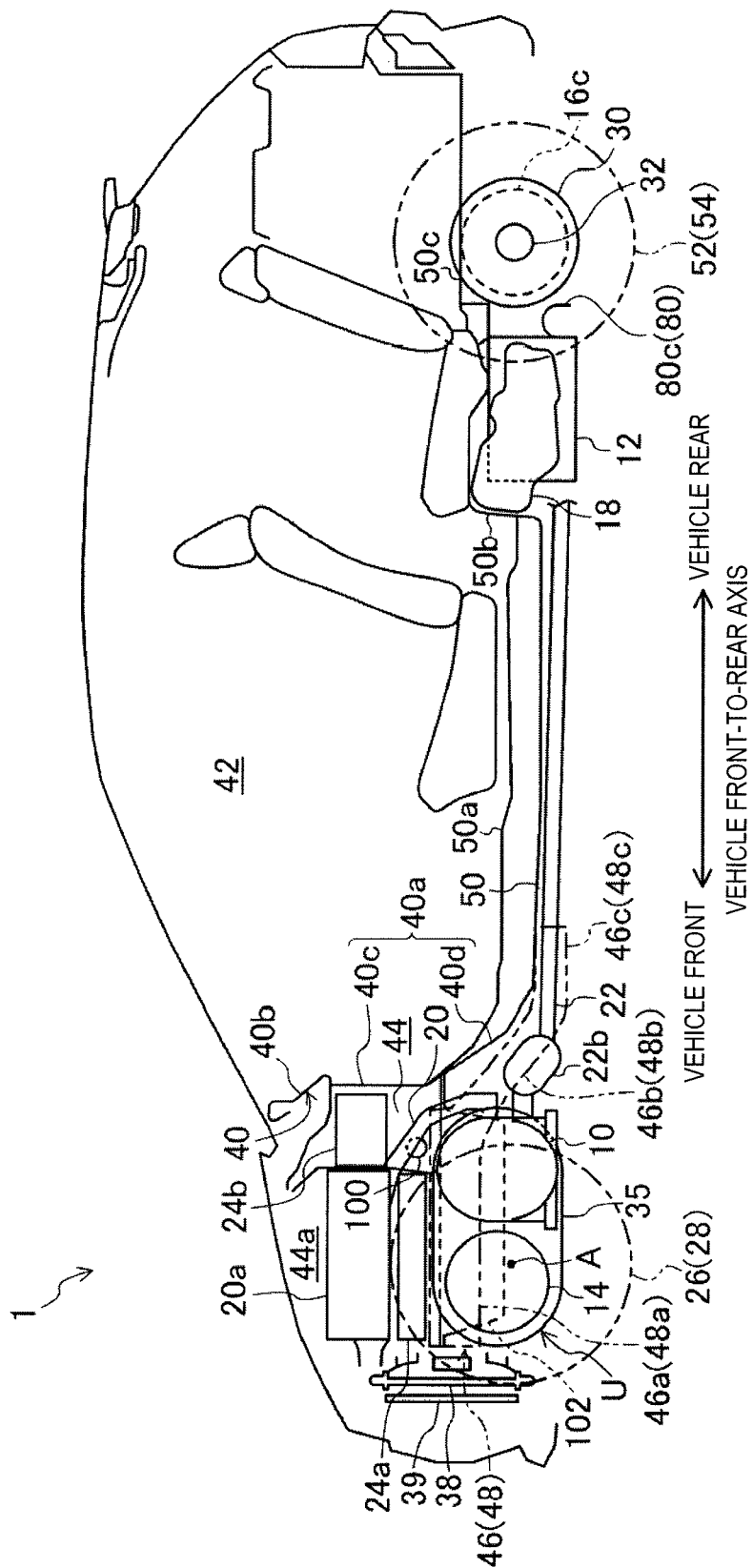
FIG. 7 is a side view schematically showing the entire structure of an electric vehicle according to a second embodiment of the invention.
Figure 8:
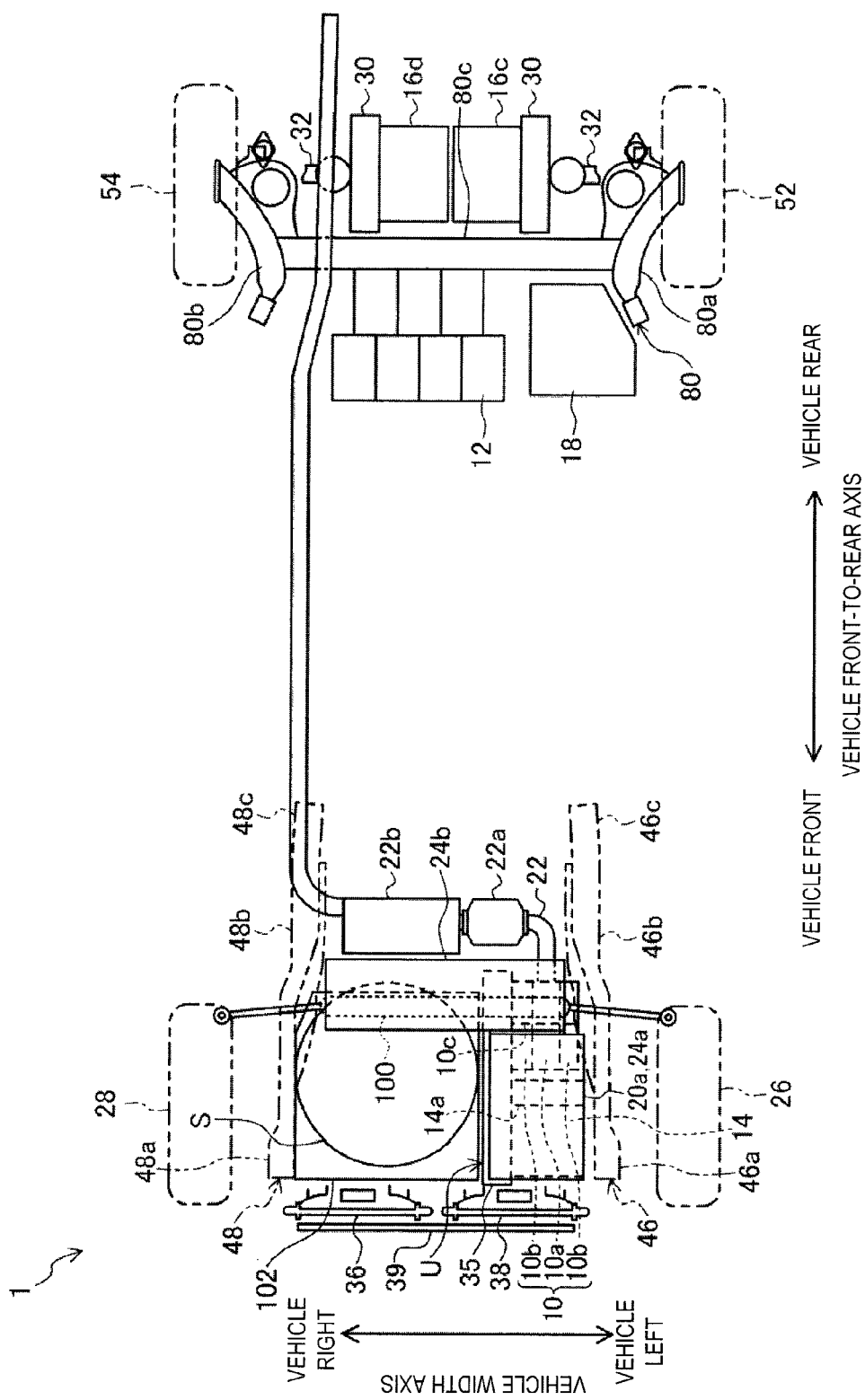
FIG. 8 is a plan view schematically showing the entire structure of the electric vehicle according to the second embodiment of the invention.

FIG. 7 is a side view schematically showing the entire structure of an electric vehicle of this embodiment. FIG. 8 is a plan view schematically showing the entire structure of the electric vehicle of this embodiment. Note that, in these figures, for easier view of the drawings, illustrations of the components are suitably omitted or simplified.

The engine 10 and the generator 14 are arranged in line along the vehicle front-to-rear axis, so that the engine 10 is located rearward from the generator 14, and the eccentric shaft 10c of the engine 10 and the rotation shaft 14a of the generator 14 extend along the vehicle width axis. The rotation shaft 14a of the generator 14 is coupled to the eccentric shaft 10c of the engine 10 so as to be in parallel to the eccentric shaft 10c, via a gear device 35. The gear device 35 constitutes a power transmission device for transmitting the motive force of the engine 10 to the generator 14 and is arranged on the right face side of the engine 10 and the generator 14. The power generation unit U constituted by the engine 10, the generator 14, and the gear device 35 being integrally coupled is arranged inside the engine room 44, adjacent to the first horizontal part 46a of the left front side frame 46 and so that the engine 10 is located rearward from the wheel axles A of the front wheels 26 and 28. An upper end of the power generation unit U is located at substantially the same height as the upper surface of the first horizontal part 46a of the front side frame 46 while a lower end of the power generation unit U is located lower than the lower surface of the first horizontal part 46a.

The intake passage 20 curves forward from a rear upper part of the engine 10, and extends forward. The air cleaner 20a is arranged above the AC-DC converter 24a in the left part of the engine room 44. That is, the air cleaner 20a is arranged above the power generation unit U, inside the engine room 44.

The exhaust passage 22 extends rearward from a rear lower part of the engine 10 to reach a position below the inclined wall part 40d of the lower dashboard part 40a, further extends rightward to reach the right end side part of the vehicle 1, and extends rearward below the floor panel 50. The exhaust emission control device 22a is arranged along the vehicle width axis below a left part of the inclined wall part 40d of the lower dashboard part 40a so that the axial direction of the exhaust emission control device 22a (longitudinal axis) is oriented along the vehicle width axis. The muffler 22b is arranged along the vehicle width axis below a section from the center part and right part of the inclined wall part 40d of the lower dashboard part 40a along the vehicle width axis to near the right side of the exhaust emission control device 22a so that the axial direction of the muffler 22b extends along the vehicle width axis. Thus, an exhaust pipe arranged rearward from the muffler 22b may be formed narrower than the exhaust emission control device 22a and the muffler 22b. Therefore, the exhaust pipe can easily be arranged below the floor, and the freedom in designing can dramatically be improved (for example, setting a battery mounting space by forming the floor into a low flat type or into a multiple layer structure).

The AC-DC converter 24a is arranged above the power generation unit U, in the left part of the engine room 44. The DC-AC converter 24b is arranged above a steering gear box 100, inside the engine room 44. The steering gear box 100 is arranged above the engine 10 and rearward from the AC-DC converter 24a so that it extends along the vehicle width axis.

A tire accommodating space 102 for accommodating a spare tire S is formed rightward from the upper part of the power generation unit U, inside the engine room 44. A cargo space 44a is formed rightward from the air cleaner 20a and the AC-DC converter 24a, forward from the DC-AC converter 24b, and above the tire accommodating space 102, inside the engine room 44.

Note that, the power generation unit U and the like are attached to the vehicle body, though the illustrations thereof are omitted in the drawings. Further, according to the first embodiment, the air-conditioning unit 60 is arranged inside the engine room 44. Alternatively, in this embodiment, the air-conditioning unit 60 is arranged outside the engine room 44 though the illustration thereof is omitted.

In this embodiment, the motor 16 is constituted with the left rear wheel motor 16c and a right rear wheel motor 16d. The left rear wheel motor 16c is coupled by its rotation shaft to the left rear wheel 52 via the reduction gear 30 and the driving shaft 32, and, by being supplied with the power from the battery 12 and/or the generator 14, it drives the left rear wheel 52. The right rear wheel motor 16d is coupled by its rotation shaft to the right rear wheel 54 via the reduction gear 30 and the driving shaft 32, and, by being supplied with the power from the battery 12 and/or the generator 14, it drives the right rear wheel 54. The left rear wheel motor 16c is arranged rearward from the cross beam 80c, below the left part of the rear floor panel 50c. The right rear wheel motor 16d is arranged rearward from the cross beam 80c, below the right part of the rear floor panel 50c. That is, the left rear wheel motor 16c and the right rear wheel motor 16d are arranged side by side along the vehicle width axis.

The configurations other than what is described above are similar to the first embodiment.

—Effects—

According to this embodiment, the effects substantially similar to the first embodiment can be obtained.

Further, in this embodiment, the engine 10, the generator 14, and the gear device 35 are integrally formed to constitute the power generation unit U, the power generation unit U is arranged inside the engine room 44, and the engine 10 which constitutes the power generation unit U is arranged rearward from the wheel axles A of the left and right front wheels 26 and 28. Therefore, the engine 10 which is comparatively heavy is arranged in a comparatively rear part of the vehicle, thereby a yaw moment of inertia can be reduced.

Further, because the engine 10 which constitutes the power generation unit U is arranged rearward from the wheel axles A of the front wheels 26 and 28, the space in front of the engine 10 and the engine room 44 can effectively be used.

Thereby, the yaw moment of inertia can be reduced, and the engine room 44 can effectively be used.

Further, the engine 10 and the generator 14 are arranged along the vehicle front-to-rear axis so that the engine 10 is located rearward from the generator 14 and the eccentric shaft 10c of the engine 10 and the rotation shaft 14a of the generator 14 extend along the vehicle width axis. The eccentric shaft 10c of the engine 10 and the rotation shaft 14a of the generator 14 are coupled in parallel to each other via the gear device 35. Therefore, the length of the power generation unit U along the vehicle width axis can be shortened.

Further, the power generation unit U is arranged adjacent to the left front side frame 46 out of the left and right front side frames 46 and 48 which are arranged inside the engine room 44 so as to extend along the vehicle front-to-rear axis. Therefore, as described above, together with the length of the power generation unit U along the vehicle width axis being shortened, a space can be created inward of the power generation unit U along the vehicle width axis and the space can be used as the cargo space 44a, thereby the engine room 44 can further effectively be used.

Moreover, the air cleaner 20a in the intake passage 20 is arranged above the power generation unit U. Therefore, the power generation unit U which is needed for the power generation and the intake passage 20 can be downsized and, thereby the engine room 44 can further effectively be used.

Further, the motors 16c and 16d are arranged in the rear part of the vehicle 1. This means that the motors 16c and 16d are arranged outside the engine room 44, and the corresponding space can be created inside the engine room 44 and the space can be used as the cargo space 44a, thereby, the engine room 44 can further effectively be used.

In this embodiment, the power transmission device is constituted with the gear device 35. However, without limiting to this, it may be constituted with a chain device (e.g., a chain and sprockets). Thus, if constituting with the chain device, the motive force of the engine 10 can be transmitted to the generator 14 at a suitable rotational speed.

In this embodiment, the power generation unit U is arranged adjacent to the left front side frame 46. However, without limiting to this, it may be arranged adjacent to the right front side frame 48.

Embodiment 3

This embodiment is different from the first embodiment in that, for example, the vehicle 1 provided with the motor 16 for driving the rear wheels 52 and 54 is a series-parallel hybrid vehicle of four-wheel drive in which the engine 10 drives the generator 14 to generate power and, in addition, the motive force of the engine 10 is transmitted to the front wheels 26 and 28 via a power splitting mechanism. Hereinafter, the difference is described in detail.

Figure 9:
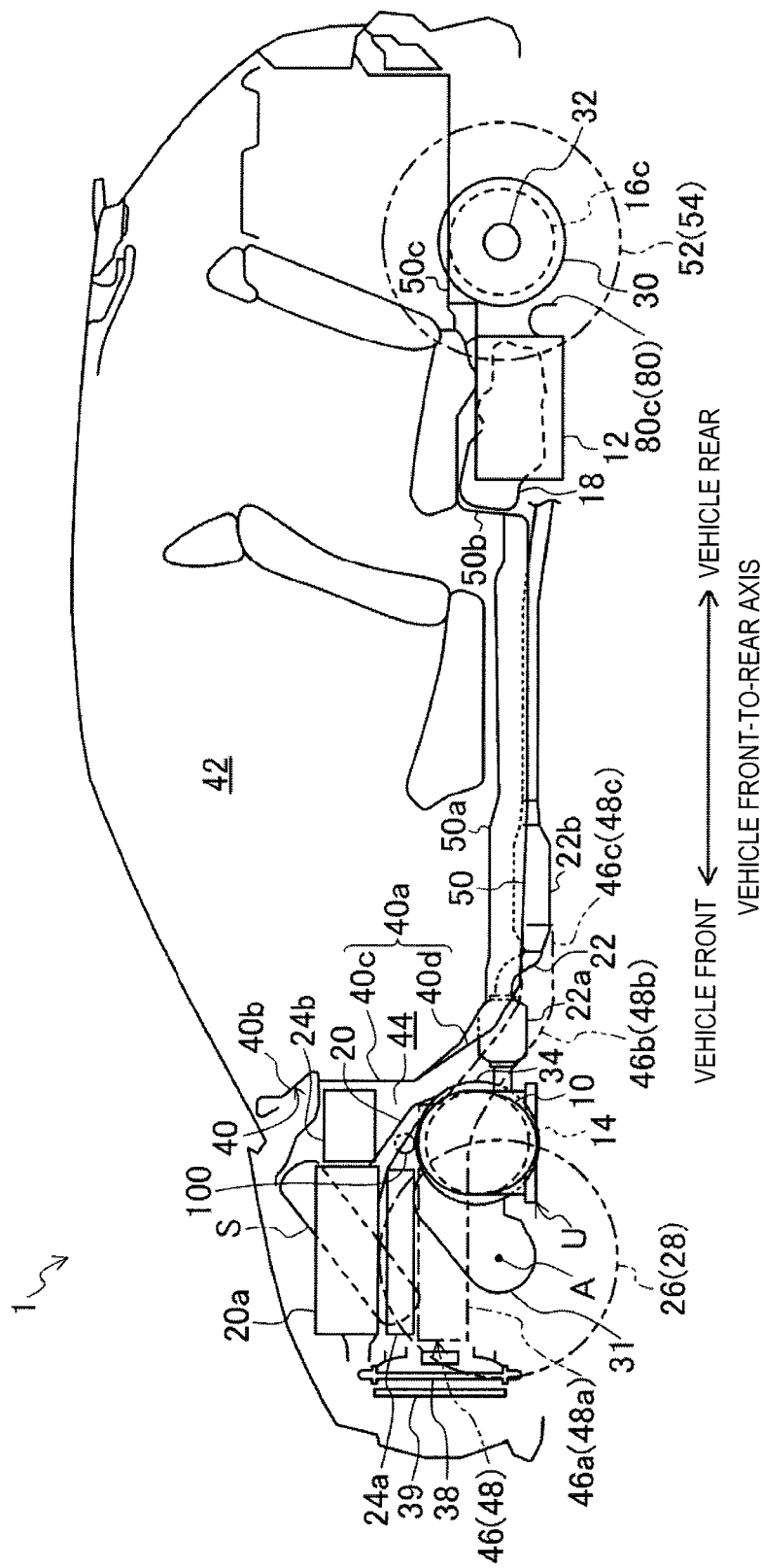
FIG. 9 is a side view schematically showing the entire structure of an electric vehicle according to a third embodiment of the invention.
Figure 10:
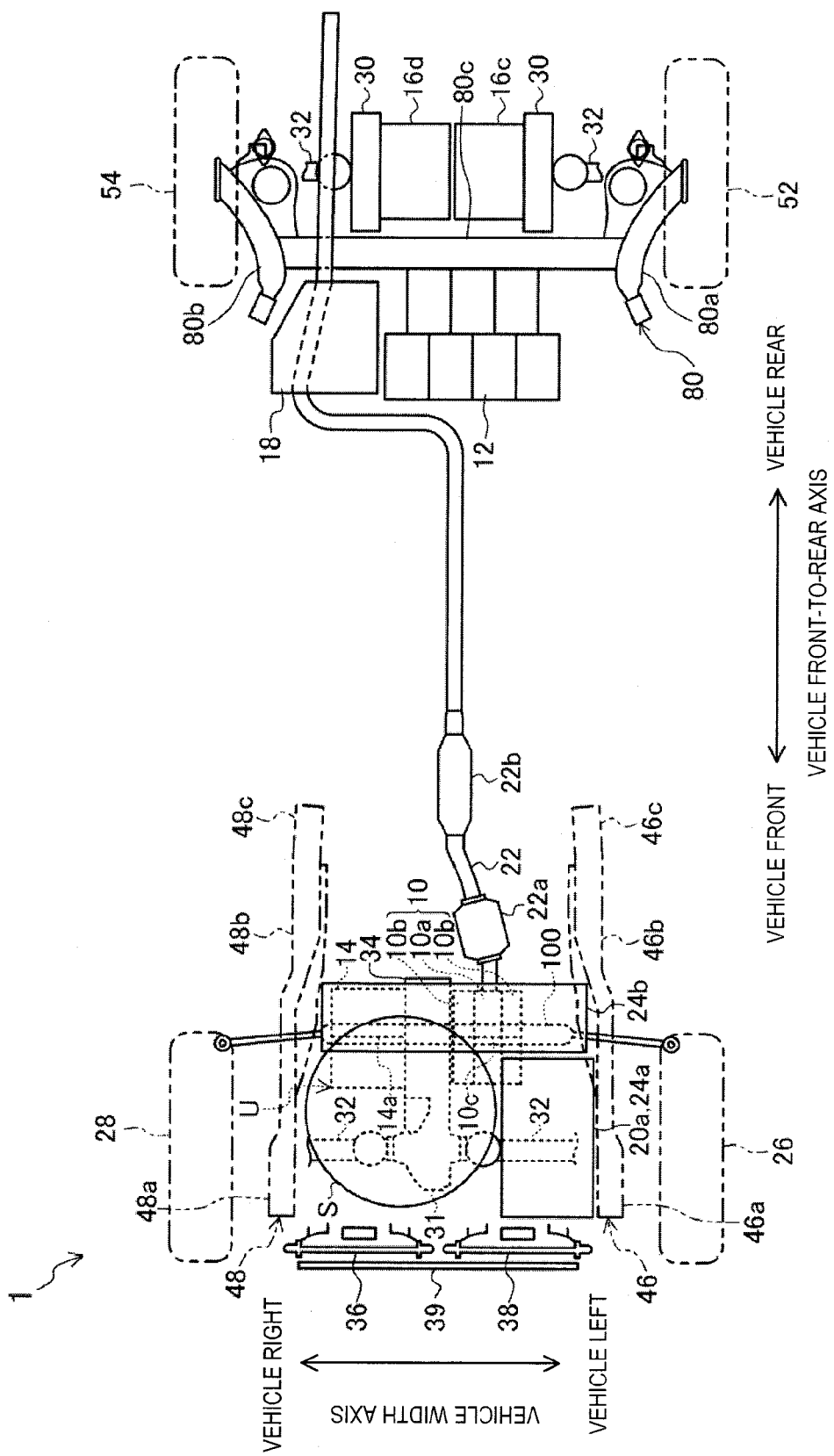
FIG. 10 is a plan view schematically showing the entire structure of the electric vehicle according to the third embodiment of the invention.
Figure 11:
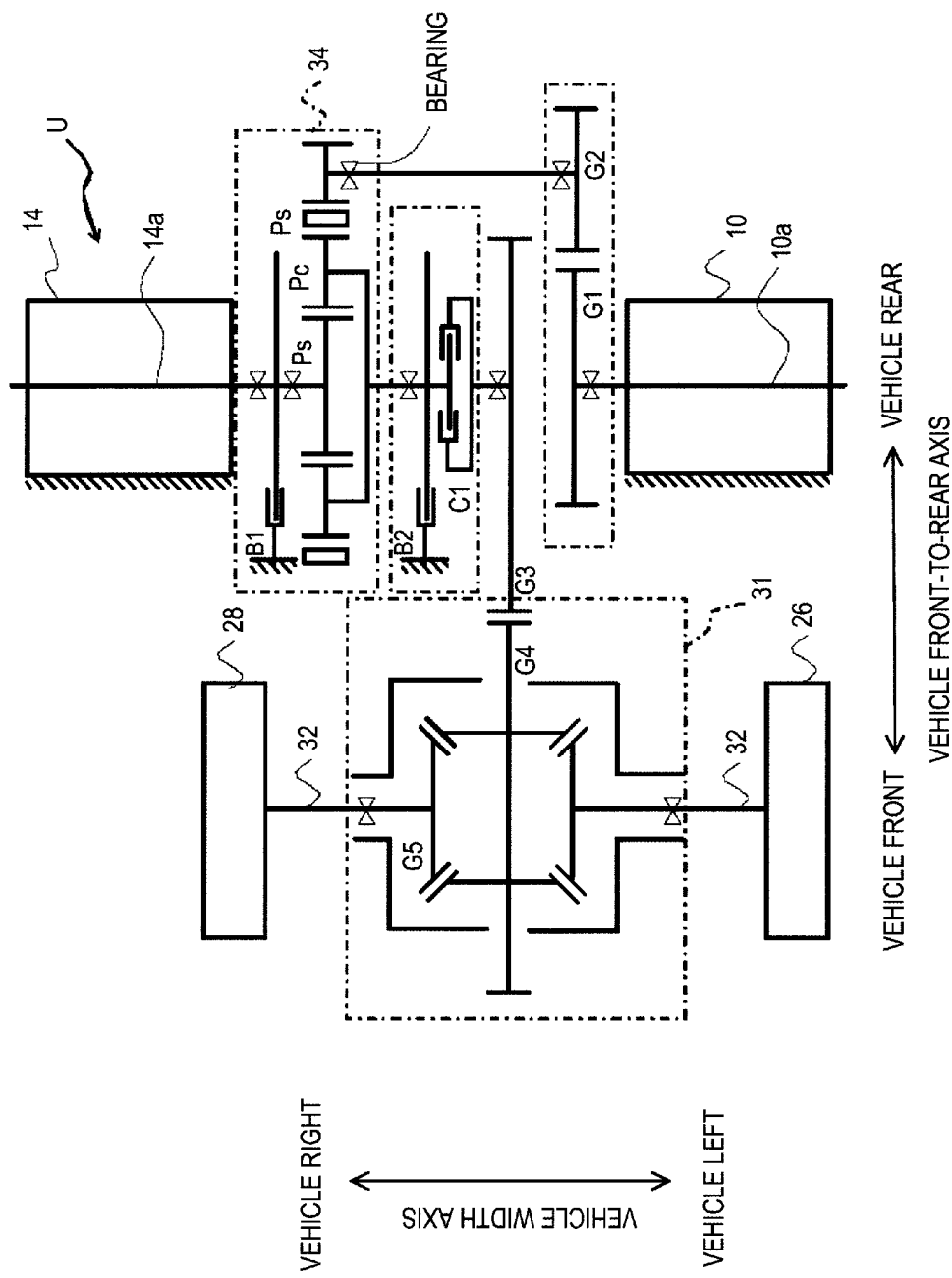
FIG. 11 is a skeleton diagram showing a power generation unit, reduction gear and the like according to the third embodiment of the invention.

FIG. 9 is a side view schematically showing the entire structure of the electric vehicle. FIG. 10 is a plan view schematically showing the entire structure of the electric vehicle. FIG. 11 is a skeleton diagram showing the power generation unit, a differential gear and the like. Note that, in these figures, for easier view of the drawings, illustrations of the components are suitably omitted or simplified. Therefore, the respective diameters, shapes, and the axis arrangement of gears are different from the actual situations. Further, unless specifically described, the respective gears, the engine 10, and the generator 14 are supported by the vehicle body via gear casing(s) and bracket(s) (not illustrated) and arranged in positions.

The power splitting mechanism is constituted with a planetary gear device 34 which includes a sun gear Ps, a ring gear Pr, and a planetary carrier Pc. The eccentric shaft 10c of the engine 10 is coupled to the rotation shaft 14a of the generator 14 and the left and right front wheels 26 and 28 via the planetary gear device 34. Specifically, the eccentric shaft 10c of the engine 10 is connected with the ring gear Pr of the planetary gear device 34 via acceleration gears G1 and G2. These acceleration gears G1 and G2 accelerate the rotational speed of the engine 10 and transmit the motive force of the engine 10 to the ring gear Pr. The shaft of the acceleration gear G1 is located coaxially with the eccentric shaft 10c of the engine 10.

The rotation shaft 14a of the generator 14 is connected with the sun gear Ps of the planetary gear device 34. The shaft of the sun gear Ps is located coaxially with the rotation shaft 14a of the generator 14. The planetary carrier Pc of the planetary gear device 34 is coupled to the front wheels 26 and 28 via a differentiation gear 31 (hereinafter, referred to as the "differential") and the left and right driving shafts 32. The differential 31 includes reduction gears G3 and G4 and a differential gear G5. The reduction gears G3 and G4 reduce the rotational speed of the engine 10 or the generator 14 and transmit the motive force of the engine 10 or the generator 14 to the front wheels 26 and 28. The differential gear G5 absorbs the difference between tracks followed by front and back inner wheels when the vehicle turning (caused by the speed difference of the outer and inner (or inner or outer) front wheels 26 and 28), and splits the motive force of the engine 10 or the generator 14 to transmit them to the front wheels 26 and 28, respectively. Further, the differential gear G5 also has a function to ultimately reduce the rotational speed of the engine 10 or the generator 14 and transmits the motive force of the engine 10 or the generator 14 to the front wheels 26 and 28.

The planetary gear device 34 is provided with a brake B1 for fixing the sun gear Ps. A clutch C1 for arbitrary connecting and disconnecting to transmit the motive force of one of the planetary carrier Pc and the differential 31 to the other, and a brake B2 for fixing the planetary carrier Pc, are interposed between the planetary carrier Pc of the planetary gear device 34 and the differential 31.

The engine 10, the planetary gear device 34, and the generator 14 are arranged in this order from the left to the right along the vehicle width axis so that the eccentric shaft 10c of the engine 10 and the rotation shaft 14a of the generator 14 extend along the vehicle width axis and are coaxially located. That is, the eccentric shaft 10c of the engine 10 and the rotation shaft 14a of the generator 14 are coupled in series via the planetary gear device 34.

The power generation unit U which is constituted with the engine 10, the generator 14, and the planetary gear device 34 being integrally coupled to each other is entirely arranged rearward from the wheel axles A of the front wheels 26 and 28, inside the engine room 44. Specifically, the power generation unit U is arranged so that the engine 10 and the planetary gear device 34 are located in the center part of the engine room 44 along the vehicle width axis and the generator 14 is located in the right part of the engine room 44.

Note that, the differential 31 is arranged forward from the planetary gear device 34, inside the engine room 44, and integrally coupled to the planetary gear device 34.

The intake passage 20 extends obliquely leftward and forward from the rear upper part of the engine 10 while curving forward, and further extends forward. The air cleaner 20a is arranged above the AD-DC converter 24a, in the left part of the engine room 44.

The exhaust passage 22 extends rearward from the rear lower part of the engine 10 to reach a position below the inclined wall part 40d of the lower dashboard part 40a, passes below the center part of the floor panel 50 along the vehicle width axis, and further extends rearward to reach a position near the front of the battery 12. Further, the exhaust passage 22 extends rightward to reach the right end side part of the vehicle 1, passes below the battery 12, and further extends rearward. The exhaust emission control device 22a is arranged below the inclined wall part 40d of the lower dashboard part 40a. The muffler 22b is arranged below the front part of the floor panel 50 (specifically, inside the floor tunnel 50a).

The AC-DC converter 24a is arranged below the air cleaner 20a, in the left part of the engine room 44. The DC-AC converter 24b is arranged above the steering gear box 100, inside the engine room 44. The steering gear box 100 is arranged so as to extend along the vehicle width axis, above the power generation unit U and rearward from the AC-DC converter 24a.

Note that, the power generation unit U and the like are attached to the body, though the illustrations thereof are omitted in the drawings.

The spare tire S is obliquely accommodated at a location inside the engine room 44 which is rightward from the air cleaner 20a and the AC-DC converter 24a and forward from the DC-AC converter 24b.

Meanwhile, the motor 16 of this embodiment is constituted with the left rear wheel motor 16c and a right rear wheel motor 16d. The left rear wheel motor 16c is coupled by its rotation shaft to the left rear wheel 52 via the reduction gear 30 and the driving shaft 32, and, by being supplied with the power from the battery 12 and/or the generator 14, it drives the left rear wheel 52. The right rear wheel motor 16d is coupled by its rotation shaft to the right rear wheel 54 via the reduction gear 30 and the driving shaft 32, and, by being supplied with the power from the battery 12 and/or the generator 14, it drives the right rear wheel 54. The left rear wheel motor 16c is arranged rearward from the cross beam 80c, below the left part of the rear floor panel 50c. The right rear wheel motor 16d is arranged rearward from the cross beam 80c, below the right part of the rear floor panel 50c. That is, the left rear wheel motor 16c and the right rear wheel motor 16d are arranged side by side along the vehicle width axis.

The battery 12 is arranged forward from the cross beam 80c, below the center part of the rear floor panel 50c along the vehicle width axis. The fuel tank 18 is arranged forward from the cross beam 80c, below the right part of the rear floor panel 50c.

The configurations other than what is described above are substantially similar to the first embodiment.

—Operation of Hybrid System—

Figure 12:
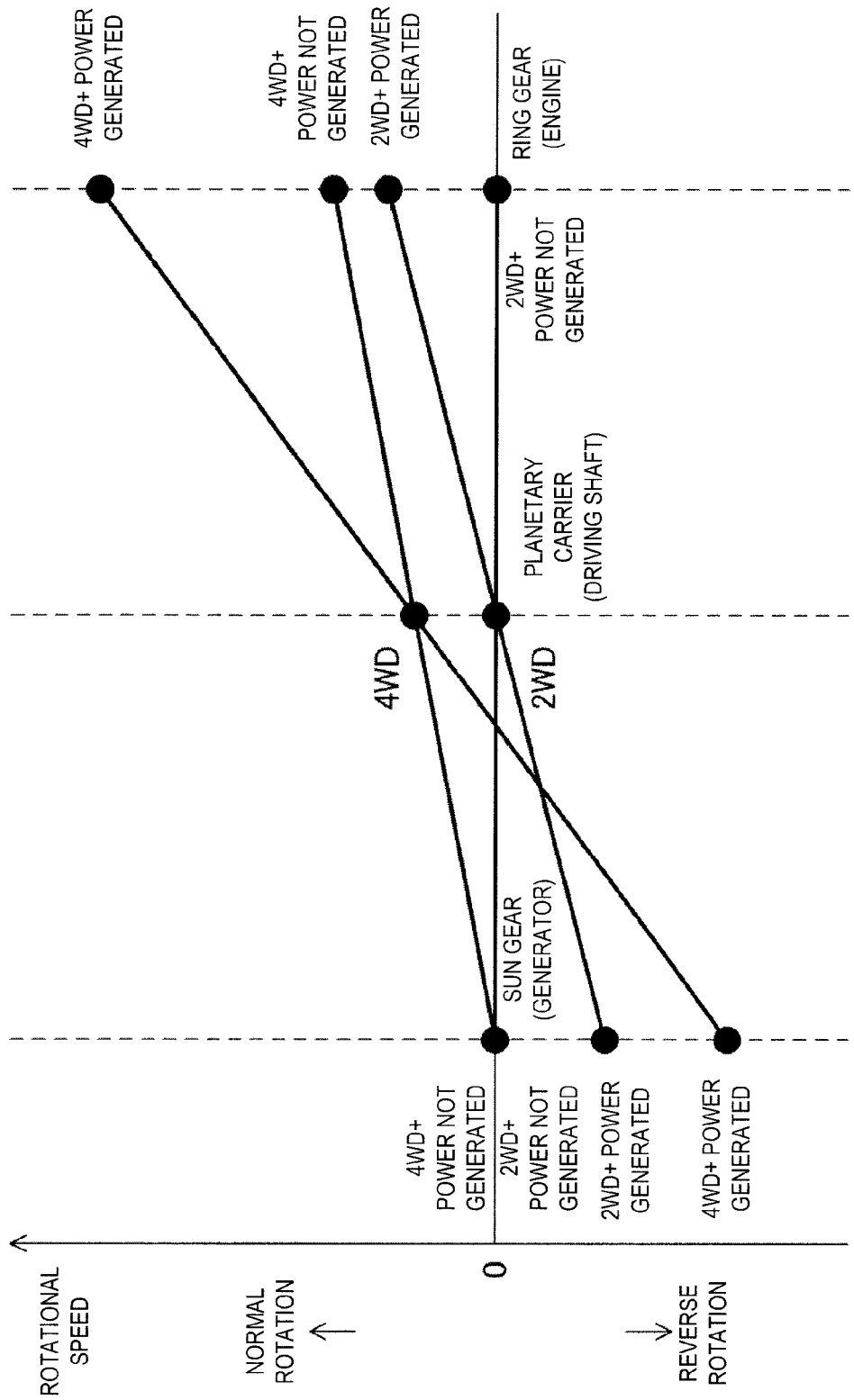
FIG. 12 is a collinear chart showing a relationship of rotational speeds of a sun gear, a planetary carrier, and a ring gear of a planetary gear device according to the third embodiment of the invention.

Hereinafter, an operation of the hybrid system is described in detail. FIG. 12 is a collinear chart showing a relationship of the sun gear (generator), the planetary carrier (driving shaft), and the ring gear (engine) of the planetary gear device.

In the four-wheel-drive mode and when the generator 14 is generating power, by switching the clutch C1 to an ON state (connecting state) and the brakes B1 and B2 to an OFF state (inactivated state), and by using the engine 10 as the motive force source, the motive force of the engine 10 is transmitted to the front wheels 26 and 28 via the planetary gear device 34 to directly drive the front wheels 26 and 28, and, at the same time, the motive force is transmitted to the generator 14 via the planetary gear device 34 to generate power. Note that, the rotational speed of the engine 10 is controlled based on required driving forces of the front wheels 26 and 28 and a required production of the power generation of the generator 14. Further, the generated power from the generator 14 is supplied to the motors 16c and 16d to drive the rear wheels 52 and 54. On the other hand, in braking, the front wheels 26 and 28 drive the generator 14 and the regenerated power from the generator 14 is supplied to the battery 12 for charging, by switching the brake B1 to the OFF state (inactivated state) and further controlling the engine 10 by the driving force inputted from the front wheels to the planetary carrier Pc so that the output of the engine 10 becomes greater than a reaction force acting on the ring gear Pr, or by switching the engine 10 to an OFF state (misfire state), so that the reverse rotation of the ring gear Pr is regulated by a rotational drag of the engine 10.

Alternatively, an additional brake may be provided in the power transmission path between the ring gear Pr or the ring gear Pr and the engine 10 so that, by switching the brake to an ON state in braking, the rotation of the ring gear Pr is stopped. Thereby, regardless of the rotational drag of the engine 10, the front wheels can efficiently drive the generator 14 in braking.

Note that, an additional clutch may be provided on the engine side from the brake, in the power transmission path between the ring gear Pr and the engine 10. The clutch is controlled to be in the ON state (the engine 10 and the planetary gear device 34 are connected) during the normal power generation and the OFF state (the engine 10 and the planetary gear device 34 are disconnected) in non-power generation or in braking to brake the ring gear Pr. Thereby, regardless of the operating state of the engine 10, the front wheels can immediately drive the generator in braking to generate power.

Alternatively, by keeping the engine 10 in the ON state in braking, and immediately after the braking, switching the brake to the OFF state and the clutch to the ON state, the engine 10 can immediately drive the front wheels 26 and 28. Thereby, in a traveling state especially where slight and frequent braking is performed in traffic jam or the like, because the regenerated power can be supplied to the battery, the total energy loss due to the frequent output variation and restart of the engine is avoided.

In the four-wheel-drive mode and when the generator 14 is not generating power, by switching the clutch C1 to the ON state, the brake B1 to the ON state, and the brake B2 to the OFF state, and by using the engine 10 as the motive force source, the motive force of the engine 10 is transmitted to the front wheels 26 and 28 via the planetary gear device 34 to directly drive the front wheels 26 and 28. Note that, the rotational speed of the engine 10 is controlled based on the required driving forces of the front wheels 26 and 28. Further, the power from the battery 12 is supplied to the motors 16*c* and 16*d* to drive the rear wheels 52 and 54. On the other hand, in braking, the front wheels 26 and 28 drive the generator 14, and the regenerated power from the generator 14 is supplied to the battery 12 for charging.

In the two-wheel-drive mode by the rear wheels 52 and 54 and when the generator 14 is generating power, by switching the clutch C1 to the OFF state (the front wheels 26 and 28 and the power generation unit U are disconnected), the brake B1 to the OFF state, and the brake B2 to the ON state, and by using the engine 10 as the motive force source, the motive force of the engine 10 is transmitted to the generator 14 via the planetary gear device 34 to generate power. Note that, the rotational speed of the engine 10 is controlled based on the required production of the power generation of the generator 14. Further, the generated power from the generator 14 is supplied to the motors 16*c* and 16*d* to drive the rear wheels 52 and 54. Moreover, as described above, by switching the clutch C1 to the OFF state and the brake B2 to the ON state, the drag of the clutch can be reduced. On the other hand, in braking, by switching the clutch C1 to the ON state, the brake B2 to the OFF state, and the engine 10 to a stop state, the front wheels 26 and 28 drive the generator 14, and the regenerated power from the generator 14 is supplied to the battery 12 for charging.

In the two-wheel-drive mode by the rear wheels 52 and 54 and when the generator 14 is not generating power, the clutch C1 is switched to the OFF state and the brake B1 is switched to the ON state, and the engine 10 is stopped. Thereby, the drag of the clutch can be reduced. On the other hand, in braking, by switching the clutch C1 to the ON state, the front wheels 26 and 28 drive the generator 14, and the regenerated power from the generator 14 is supplied to the battery 12 for charging.

—Effects—

As described above, according to this embodiment, the effects substantially similar to the first embodiment can be obtained.

The motors 16*c* and 16*d* are arranged in the rear part of the vehicle 1. This means that the motors 16*c* and 16*d* are arranged outside the engine room 44, and the corresponding space can be created in the engine room 44, thereby the engine room 44 can further effectively be used (for example, using the space as the cargo space 44*a*).

Further, the eccentric shaft 10*c* of the engine 10 is coupled to the rotation shaft 14*a* of the generator 14 and the front wheels 26 and 28 via the planetary gear device 34. Therefore, the front wheels 26 and 28 can be driven by the engine 10, thereby the four-wheel drive becomes possible.

Embodiment 4

This embodiment is different from the third embodiment in that, for example, the eccentric shaft 10*c* of the engine 10 and the rotation shaft 14*a* of the generator 14 are coupled in parallel to each other via the planetary gear device 34. Hereinafter, the difference is described in detail.

Figure 13:
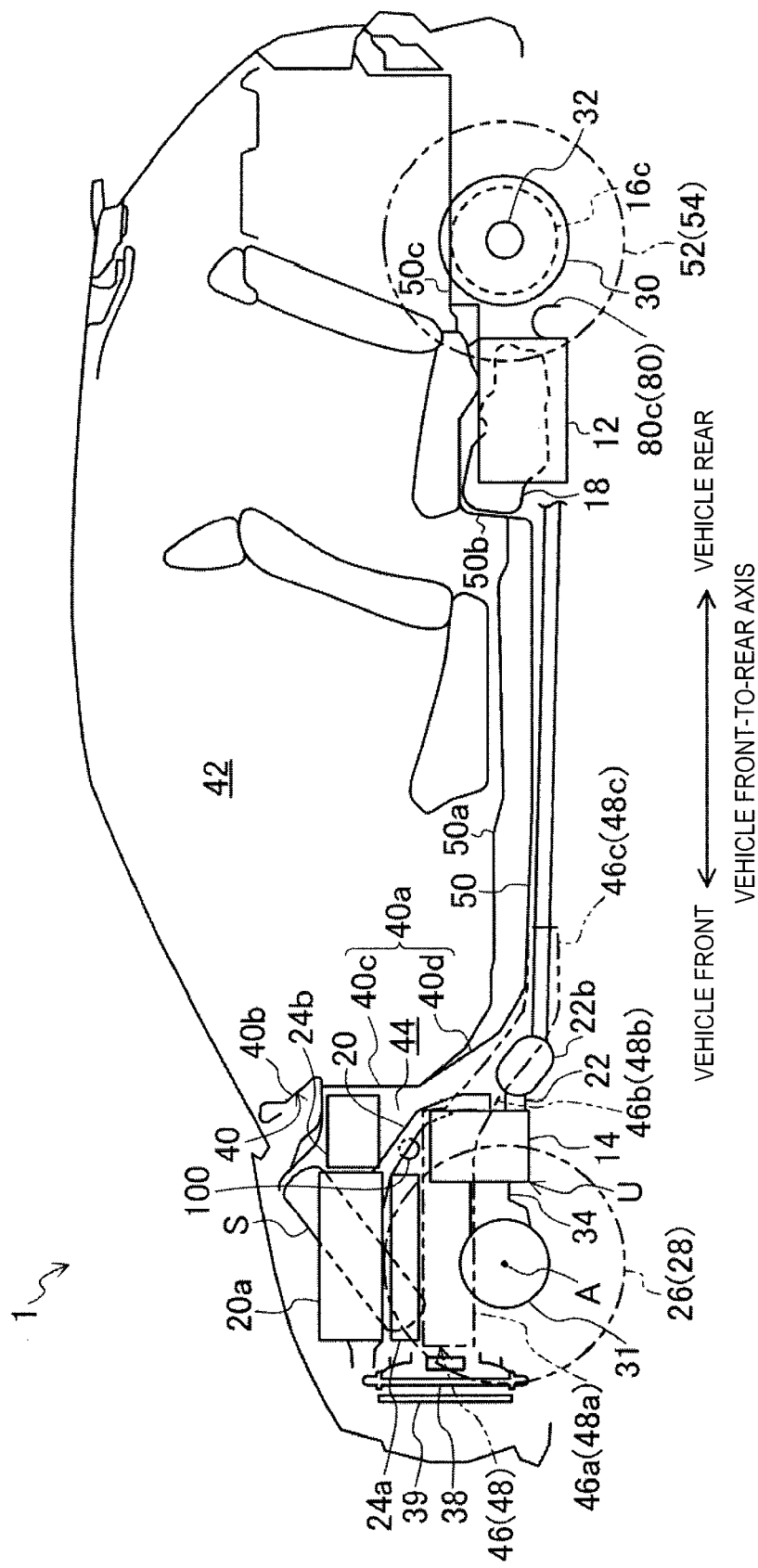
FIG. 13 is a side view schematically showing the entire structure of an electric vehicle according to a fourth embodiment of the invention.
Figure 14:
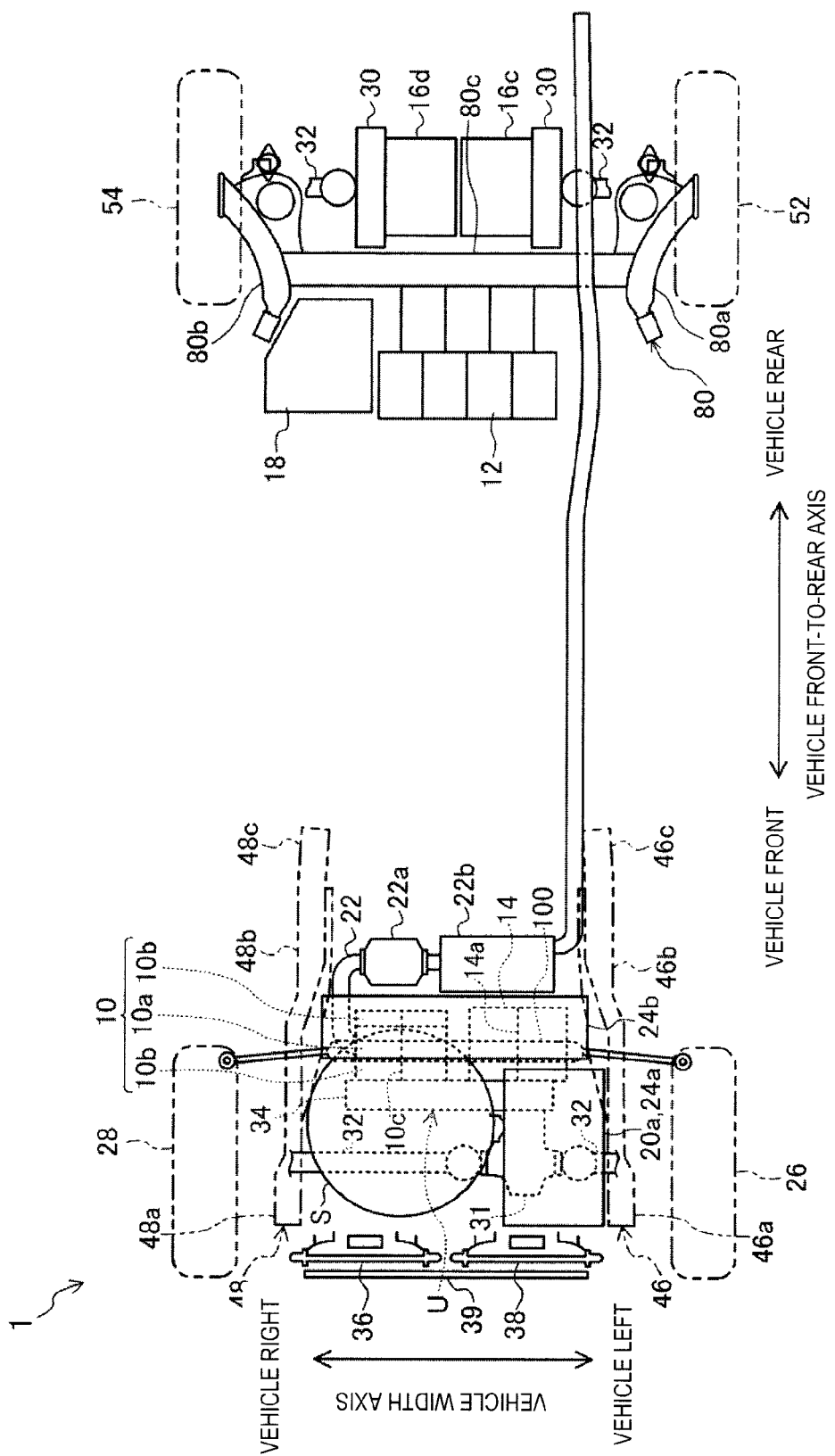
FIG. 14 is a plan view schematically showing the entire structure of the electric vehicle according to the fourth embodiment of the invention.
Figure 15:
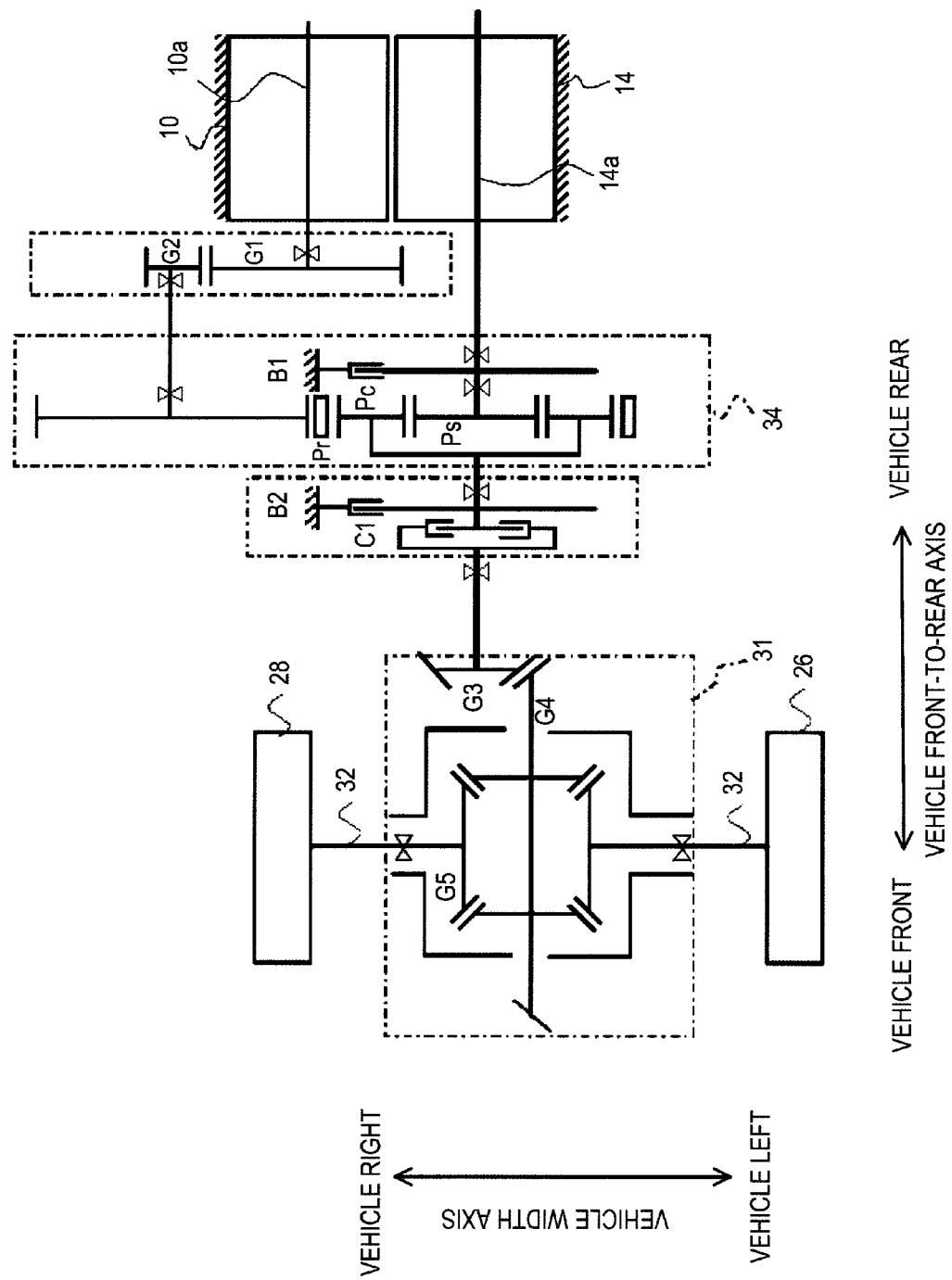
FIG. 15 is a skeleton diagram showing a power generation unit, reduction gear and the like according to the fourth embodiment of the invention.

FIG. 13 is a side view schematically showing the entire structure of an electric vehicle of this embodiment. FIG. 14 is a plan view schematically showing the entire structure of the electric vehicle of this embodiment. FIG. 15 is a skeleton diagram showing a power generation unit, a differential gear and the like. Note that, in these figures, for easier view of the drawings, illustrations of the components are suitably omitted or simplified.

The engine 10 is arranged so that the intake and exhaust ports face rightward. The engine 10 and the generator 14 are arranged along the vehicle width axis so that the engine 10 is located rightward from the generator 14, and the eccentric shaft 10*c* of the engine 10 and the rotation shaft 14*a* of the generator 14 extend along the vehicle front-to-rear axis. The rotation shaft 14*a* of the generator 14 is coupled in parallel to the eccentric shaft 10*c* of the engine 10 via the planetary gear device 34. The planetary gear device 34 is arranged on the front face side of the engine 10 and the generator 14.

The power generation unit U which is constituted with the engine 10, the generator 14, and the planetary gear device 34 being coupled to each other is entirely arranged rearward from the wheel axles A at the centers of the front wheels 26 and 28, inside the engine room 44. Specifically, the power generation unit U is arranged so that the engine 10 is located in the right part of the engine room 44, and the generator 14 is arranged in the left part of the engine room 44.

Note that, the differential 31 is arranged forward from the planetary gear device 34, inside the engine room 44, and integrally coupled to the planetary gear device 34. Further, the coupling structure of the engine 10 to the generator 14 and the front wheels 26 and 28 via the planetary gear device 34 is substantially similar to the first embodiment, except that the eccentric shaft 10*c* of the engine 10 and the rotation shaft 14*a* of the generator 14 are coupled in parallel to each other (see FIG. 15).

The intake passage 20 curves rearward from the left upper part of the engine 10, extends obliquely leftward, forward and upward, and further extends forward.

The exhaust passage 22 curves rearward from the left lower part of the engine 10 to reach a position below the inclined wall part 40*d* of the lower dashboard part 40*a*, extends leftward to reach the left end part of the vehicle 1, and, further, passes below the floor panel 50 and extends rearward. The exhaust emission control device 22*a* is arranged along the vehicle width axis below the right part of the inclined wall part 40*d* of the lower dashboard part 40*a* so that the axial direction of the exhaust emission control device 22*a* extends along the vehicle width axis. The muffler 22*b* is arranged along the vehicle width axis below a section between the center part and the left part of the inclined wall part 40*d* of the lower dashboard part 40*a* and near the left side of the exhaust emission control device 22*a* so that the axial direction of the muffler 22*b* extends along the vehicle width axis.

The configurations of this embodiment other than what is described above are substantially similar to the third embodiment.

Further, the operation of the hybrid system of this embodiment is substantially similar to the third embodiment (see FIG. 12 and other figures).

—Effects—

As described above, according to this embodiment, the effects substantially similar to the third embodiment can be obtained.

(Other Embodiment(s))

Figure 16:
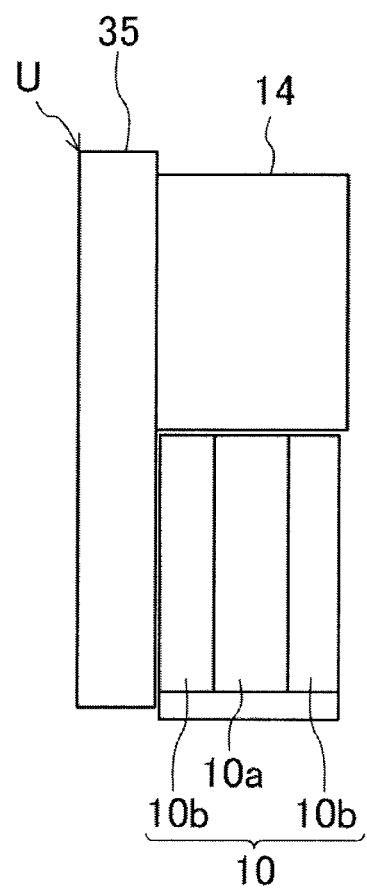
FIG. 16 is a front view schematically showing the entire structure of a power generation unit according to other embodiment(s) of the present invention.

In the above-described embodiments, the engine 10 and the generator 14 are arranged along the vehicle width axis or the vehicle front-to-rear axis. However, without limiting to this, as shown in FIG. 16, they may be arranged along the vertical axis so that the engine 10 is located below the generator 14, rearward from the wheel axles A of the front wheels 26 and 28. Thus, if the engine 10 and the generator 14 are arranged vertically, a space can be created at the lateral position from the power generation unit U, and thereby the engine room 44 can further effectively be used. Further, the engine 10 and the generator 14 are arranged vertically so that the engine 10 is located below the generator 14. Therefore, the engine 10 which is comparatively heavy is arranged at a comparatively lower location in the vehicle, thereby the center of gravity can be lowered.

Further, in the above-described embodiments, the engine 10 is the single-rotor rotary engine. However, without limiting to this, it may be, for example, a compact reciprocating engine having one cylinder or two cylinders.

Unless deviating from the spirit and scope of the present invention, the components of the respective embodiments may be arbitrarily combined.

As described above, the present invention should not be limited to the above embodiments, and it may be implemented in other various forms without deviating from the spirit or the subject matters.

Thus, the above-described embodiments are merely illustrations in all aspects, and therefore, it must not be interpreted in a limited way. The scope of the present invention is defined by the following claims, but it is not restricted by this specification in any way. In addition, all of modifications and changes falling under the equivalent range of the claims are within the scope of the present invention.

As described above, the structure of the electric vehicle according to the present invention can be used in applications in need of reducing the yaw moment of inertia, and effectively using the engine room.

The invention claimed is:

1. A structure of an electric vehicle, comprising:
   an engine;
   an electric generator for being driven by the engine;
   a battery for being supplied and charged with power generated at least from the electric generator; and
   a motor for being supplied with power from the battery to drive driving wheels;
   the engine, the electric generator, and a power transmission device for transmitting a motive force of the engine to the electric generator being integrally formed to constitute a power generation unit, and the power generation unit being arranged inside an engine room so that at least the engine is located rearward from wheel axles of left and right front wheels;
   wherein the engine and the electric generator are arranged vertically so that the engine is located below the electric generator.

2. The structure of claim 1, wherein the power generation unit is entirely arranged rearward from the wheel axles of the front wheels, and the power transmission device is one of a chain device and a gear device.

3. The structure of claim 2, wherein the power transmission device is a planetary gear device; and
   wherein the engine, the planetary gear device, and the electric generator are arranged along a vehicle width axis in this order so that a driving shaft of the engine and a rotation shaft of the electric generator extend along the vehicle width axis and are located coaxially.

4. The structure of claim 1, further comprising an air-conditioning unit, a part of which is arranged above the engine, inside the engine room.

5. The structure of claim 4, wherein the engine and the electric generator are arranged along a vehicle front-to-rear axis so that the engine is located rearward from the electric generator and a driving shaft of the engine and a rotation shaft of the electric generator extend along a vehicle width axis;
   wherein the driving shaft of the engine and the rotation shaft of the electric generator are coupled in parallel to each other via the power transmission device; and
   wherein the power generation unit is arranged adjacent to one of left and right front side frames that are arranged inside the engine room so as to extend along the vehicle front-to-rear axis.

6. The structure of claim 5, wherein an intake system of the engine is arranged above the power generation unit.

7. The structure of claim 6, wherein the motor is arranged in a rear part of the vehicle and drives left and right rear wheels that serve as the driving wheels.

8. The structure of claim 7, wherein the driving shaft of the engine is coupled to the rotation shaft of the electric generator and the front wheels via a power splitting mechanism that serves as the power transmission device.

9. The structure of claim 8, wherein the power transmission device is a planetary gear device; and
   wherein the engine, the planetary gear device, and the electric generator are arranged along the vehicle width axis in this order so that the driving shaft of the engine and the rotation shaft of the electric generator extend along the vehicle width axis and are located coaxially.

10. The structure of claim 9, wherein the engine is a single-rotor rotary engine.

11. The structure of claim 1, wherein the power transmission device is a planetary gear device; and
    wherein the engine, the planetary gear device, and the electric generator are arranged along a vehicle width axis in this order so that a driving shaft of the engine and a rotation shaft of the electric generator extend along the vehicle width axis and are located coaxially.

12. The structure of claim 1, further comprising an air-conditioning unit, a part of which is arranged above the engine, inside the engine room.

13. A structure of an electric vehicle, comprising:
    an engine;
    an electric generator for being driven by the engine;
    a battery for being supplied and charged with power generated at least from the electric generator; and
    a motor for being supplied with power from the battery to drive driving wheels;
    the engine, the electric generator, and a power transmission device for transmitting a motive force of the engine to the electric generator being integrally formed to constitute a power generation unit, and the power generation unit being arranged inside an engine room so that at least the engine is located rearward from wheel axles of left and right front wheels;
    wherein the engine and the electric generator are arranged along a vehicle front-to-rear axis so that the engine is located rearward from the electric generator and a driving shaft of the engine and a rotation shaft of the electric generator extend along a vehicle width axis;
    wherein the driving shaft of the engine and the rotation shaft of the electric generator are coupled in parallel to each other via the power transmission device; and
    wherein the power generation unit is arranged adjacent to one of left and right front side frames that are arranged inside the engine room so as to extend along the vehicle front-to-rear axis.

14. The structure of claim 13, wherein an intake system of the engine is arranged above the power generation unit.

15. The structure of claim 1, wherein the motor is arranged in a rear part of the vehicle and drives left and right rear wheels that serve as the driving wheels.

16. A structure of an electric vehicle, comprising:
    an engine;
    an electric generator for being driven by the engine;
    a battery for being supplied and charged with power generated at least from the electric generator; and
    a motor for being supplied with power from the battery to drive driving wheels;
    the engine, the electric generator, and a power transmission device for transmitting a motive force of the engine to the electric generator being integrally formed to constitute a power generation unit, and the power generation unit being arranged inside an engine room so that at least the engine is located rearward from wheel axles of left and right front wheels;
    wherein the motor is arranged in a rear part of the vehicle and drives left and right rear wheels that serve as the driving wheels; and
    wherein a driving shaft of the engine is coupled to a rotation shaft of the electric generator and the front wheels via a power splitting mechanism that serves as the power transmission device.

* * * * *